US012322025B2

(12) United States Patent
Howson et al.

(10) Patent No.: US 12,322,025 B2
(45) Date of Patent: Jun. 3, 2025

(54) REDUCING REDUNDANT RENDERING IN A GRAPHICS SYSTEM

(71) Applicant: Imagination Technologies Limited, Kings Langley (GB)

(72) Inventors: John W. Howson, St. Albans (GB); Xile Yang, Rickmansworth (GB); Maurizio Zucchelli, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 195 days.

(21) Appl. No.: 18/129,126

(22) Filed: Mar. 31, 2023

(65) Prior Publication Data

US 2023/0410427 A1    Dec. 21, 2023

(30) Foreign Application Priority Data

Mar. 31, 2022   (GB) ...................................... 2204714
Mar. 31, 2022   (GB) ...................................... 2204715

(51) Int. Cl.
*G06T 1/20* (2006.01)
*G06T 15/00* (2011.01)
*G06T 17/10* (2006.01)

(52) U.S. Cl.
CPC .............. *G06T 15/005* (2013.01); *G06T 1/20* (2013.01); *G06T 17/10* (2013.01)

(58) Field of Classification Search
CPC ... G06T 1/20; G06T 1/60; G06T 11/40; G06T 15/005; G06T 17/10; G06T 2210/08
(Continued)

(56) References Cited

U.S. PATENT DOCUMENTS

2014/0267338 A1   9/2014  Spangler et al.
2015/0091892 A1   4/2015  Kwon et al.
(Continued)

FOREIGN PATENT DOCUMENTS

EP    3032499 A1   6/2016
GB    2546073 A    7/2017
(Continued)

*Primary Examiner* — Jacinta M Crawford
(74) *Attorney, Agent, or Firm* — Potomac Law Group, PLLC; Vincent M DeLuca

(57) ABSTRACT

A method and system for performing a render using a graphics processing unit that implements a tile-based graphics pipeline where a rendering space is sub-divided into tiles. Geometry data for the render is received, the geometry data including primitives associated with one or more vertex shader programs. The geometry data is processed using the vertex shader programs to generate processed primitives, and it is determined in which tile each of the processed primitives are located. For at least one selected tile there is stored i) a representation of per-tile vertex shader data identifying the one or more vertex shader programs used to generate the processed primitives in that tile, and ii) a representation of per-tile render data that can be used when rendering the processed primitives in that tile in subsequent stages of the graphics pipeline. It is determined whether the output of a previous render for the selected tile(s) can be used as an output for the render by comparing the per-tile vertex shader data of that tile with that of the previous render before comparing the per-tile render data of that tile with that of the previous render.

20 Claims, 15 Drawing Sheets

(58) Field of Classification Search
USPC .......................................................... 345/506
See application file for complete search history.

(56) References Cited

U.S. PATENT DOCUMENTS

| | | |
|---|---|---|
| 2016/0110837 A1 | 4/2016 | Sideris et al. |
| 2016/0163087 A1* | 6/2016 | Cho ........................ G06T 11/40 |
| | | 345/420 |
| 2016/0260249 A1 | 9/2016 | Persson et al. |
| 2016/0328820 A1 | 11/2016 | Fernandez et al. |
| 2018/0040098 A1* | 2/2018 | Murarka ................... G06T 1/20 |
| 2018/0197269 A1 | 7/2018 | Broadhurst et al. |
| 2020/0005423 A1 | 1/2020 | Bonfiglioli et al. |
| 2020/0202484 A1 | 6/2020 | Brigg et al. |
| 2021/0158598 A1 | 5/2021 | Bratt et al. |
| 2022/0012841 A1 | 1/2022 | Buch et al. |
| 2022/0395748 A1 | 12/2022 | Salvi et al. |

FOREIGN PATENT DOCUMENTS

| | | |
|---|---|---|
| GB | 2551689 A | 1/2018 |
| GB | 2579112 A | 6/2020 |
| WO | 2015/175231 A1 | 11/2015 |

* cited by examiner

REDUCING REDUNDANT RENDERING IN A GRAPHICS SYSTEM

CLAIM OF PRIORITY

This application claims foreign priority under 35 U.S.C. 119 from United Kingdom patent application Nos. 2204714.6 and 2204715.3 filed on 31 Mar. 2022, which are herein incorporated by reference in their entirety.

TECHNICAL FIELD

The present disclosure relates to reducing redundant rendering in a graphics system.

BACKGROUND

Graphics processing systems are typically configured to receive graphics data, e.g. from an application running on a computer system, and to render the graphics data to provide a rendering output. For example, the graphics data provided to a graphics processing system may describe geometry within a three-dimensional (3D) scene to be rendered, and the rendering output may be a rendered image of the scene. Alternatively, a rendered image of the scene may be formed from multiple rendered outputs (e.g. from compositing the rendering outputs).

Some graphics processing systems (which may be referred to as "tile-based" graphics processing systems) use a rendering space which is subdivided into a plurality of tiles. The "tiles" are regions of the rendering space, and may have any suitable shape, but are typically rectangular (where the term "rectangular" includes square). To give some examples, a tile may cover a 16×16 block of pixels or a 32×32 block of pixels of an image to be rendered. Subdividing the rendering space into tiles allows an image to be rendered in a tile-by-tile manner, wherein graphics data for a tile can be temporarily stored "on-chip" during the rendering of the tile, thereby reducing the amount of on-chip memory that needs to be implemented on a graphics processing unit (GPU) of the graphics processing system.

Tile-based graphics processing systems typically operate in two phases. During the first phase, the graphics data (e.g. as received from an application) is processed to generate a set of processed graphics data items, referred to as primitives. Primitives may represent geometric shapes which describe the surface of structures within the scene. Primitives may, for example, take the form of 2D geometric shapes, lines or points. Primitives have one or more vertices—for example a triangular primitive has one vertex at each corner, i.e. three vertices. An object, or structure, within the scene can be composed of one or more primitives. In some cases, structures can be composed of many (e.g. hundreds, thousands, millions etc.) primitives. The processed primitives are then analysed to determine, for each tile, which primitives are located at least partially within that tile.

This first phase may be referred to as the geometry processing phase herein. During this phase, operations performed on the graphics data are typically per-vertex, or per-primitive operations.

During the second phase, a tile can be rendered by processing the primitives determined to be located, at least partially, within that tile. In some cases, as part of the transition from the first phase to the second phase, the primitives determined to be located within a tile may be sampled at sampling positions to determine which elementary areas of the screen (e.g. pixels) the primitive is present in. A fragment may then be generated for each of the elementary areas. The generated fragments may then be processed during the second phase to render the tile. The operations performed as part of the second phase to render the tile are therefore typically per-pixel, or per-fragment operations.

The output of the second phase (for a particular tile being rendered) may take the form of a set of values (e.g. colour values) for each pixel within the tile. That is, the output of the second phase may be a set of per-pixel values. Following the conclusion of the first phase, each tile may be processed in accordance with the second phase in turn (or at least partially in parallel). The second phase may be referred to as the rendering phase herein.

FIG. 1 shows an example of a tile-based graphics processing system which may be used to render an image of a 3D scene. A schematic illustration of a 3D scene is shown in FIG. 2 at 200.

The graphics processing system 100 comprises a graphics processing unit (GPU) 102 and two portions of memory 1041 and 1042, which may or may not form part of the same physical memory.

The GPU 102 comprises geometry processing logic 106, a tiling unit 108 and rendering logic 110, wherein the rendering logic 110 comprises a fetch unit 112 and fragment processing logic 114. The rendering logic 110 may be configured to implement hidden surface removal (HSR) and texturing and/or shading on graphics data (e.g. primitive fragments) for tiles of the rendering space.

The geometry processing logic 106 is configured to receive from an application graphics data (e.g. in the form of primitives) that describes a scene to be rendered (e.g. scene 200 in FIG. 2). In a geometry processing phase, the geometry processing logic 106 performs geometry processing functions such as clipping and culling to remove primitives which do not fall into a visible view. The geometry processing logic 106 may also project the primitives into screen-space (shown schematically in FIG. 2 at 202). The geometry processing logic 106 may also execute vertex shader programs on the primitives, for example to manipulate or change the primitive or vertex data. The geometry processing logic 106 may further perform operations such as hull shaders, tessellation and domain shaders. The processed primitives which are output from geometry processing logic 106 are passed to the tiling unit 108 which determines which primitives are present within (i.e. at least partially intersect) each of the tiles of the rendering space of the graphics processing system 100 (e.g. tiles 204A-D). The tiling unit 108 may assign primitives to tiles of the rendering space by creating control streams (or "display lists" or "tile lists") for the tiles, wherein the control stream for a tile includes indications of primitives which are present within the tile. The processed primitive data is collated and stored in data structures called primitive blocks in the memory 1041, and the control streams indicating which primitives are located in which tiles are output from the tiling unit 108 and stored in the memory 1041.

In a rendering phase, the rendering logic 110 renders graphics data for tiles of the rendering space to generate values of a render, e.g. rendered image values. The rendering logic 110 may be configured to implement any suitable rendering technique, such as rasterisation or ray tracing to perform the rendering. In order to render a tile, the fetch unit 112 fetches the control stream for a tile and the primitives relevant to that tile from the primitive blocks, e.g. from the memory 1041 or from a cache. The fragment processing logic 114 may perform operations including hidden surface removal and shading and/or texturing on primitive fragments (i.e. a fragment formed by sampling a primitive) to thereby form the rendered image values for the tile. The texturing and/or shading may be performed by executing suitable shader programs. The rendered image values (e.g. pixel colour values) can then be passed to the memory 1042 for storage. The rendered image can be outputted from the graphics processing system 100 and used in any suitable manner, e.g. displayed on a display or stored in memory or transmitted to another device, etc.

When certain applications are run (e.g. user interfaces, 2D games, applications with static backgrounds etc.), the situation can arise whereby the graphics processing system outputs the same rendered values (either across the whole image or parts of the image) for multiple renders. That is, an entire image, or one or more tiles of the image, may have the same content (and thus the same rendered values) over a sequence of multiple renders. This means that the graphics processing unit may perform the same operations over multiple renders only to output the same rendered values for one or more tiles of the image, resulting in unnecessary processing.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method and system are disclosed for performing a render using a graphics processing unit that implements a tile-based graphics pipeline where a rendering space is sub-divided into tiles. Geometry data for the render is received, the geometry data including primitives associated with one or more vertex shader programs. The geometry data is processed using the vertex shader programs to generate processed primitives, and it is determined which tile each of the processed primitives are located in. For at least one selected tile there is stored i) a representation of per-tile vertex shader data identifying the one or more vertex shader programs used to generate the processed primitives in that tile, and ii) a representation of per-tile render data that can be used when rendering the processed primitives in that tile in subsequent stages of the graphics pipeline. It is determined whether the output of a previous render for the selected tile(s) can be used as an output for the render by comparing the per-tile vertex shader data of that tile with that of the previous render before comparing the per-tile render data of that tile with that of the previous render.

A first aspect provides a method of performing a render using a graphics processing unit configured to implement a tile-based graphics pipeline in which a rendering space is sub-divided into a plurality of tiles, the method comprising: receiving geometry data for the render, the geometry data comprising a plurality of primitives each associated with one or more vertex shader programs; processing the geometry data using the one or more vertex shader programs to generate one or more processed primitives; determining which of the processed primitives are located within each tile of the plurality of tiles; for at least one selected tile of the plurality of tiles, storing i) a representation of per-tile vertex shader data identifying the one or more vertex shader programs used to generate the processed primitives located within that tile, and ii) a representation of per-tile render data that can be used when rendering the processed primitives within that tile in subsequent stages of the graphics pipeline; and for the or each selected tile, determining whether the output of a previous render for that tile can be used as an output for the render by comparing the per-tile vertex shader data of that tile with that of the previous render before comparing the per-tile render data of that tile with that of the previous render.

Determining whether the output of the previous render for that tile can be used as the output for the render may comprise: determining whether the per-tile vertex shader data matches corresponding per-tile vertex shader data for a previous render; in response to determining that the per-tile vertex shader data does match, determining whether the per-tile render data of that tile matches corresponding per-tile render data for the previous render; and in response to determining that the per-tile render data does match, using the output of the previous render for that tile as the output for the render.

Determining whether the output of the previous render for that tile can be used as the output for the render may further comprise: in response to determining that the per-tile vertex shader data does not match, causing the graphics pipeline to render that tile. Determining whether the output of the previous render for that tile can be used as the output for the render may further comprise: in response to determining that the per-tile render data does not match, causing the graphics pipeline to render that tile.

The method may further comprise storing render-wide data indicating one or more characteristics of the render and, prior to determining whether the output of a previous render for that tile can be used as an output for the render, using the render-wide data to check whether to skip the per-tile vertex shader data and per-tile render data comparison and cause the graphics pipeline to render that tile. The render-wide data may comprise a clear colour, and using the render-wide data to check whether to skip the per-tile vertex shader data and per-tile render data comparison may comprise determining whether the clear colour matches with that of the previous render. The render-wide data may comprise a valid flag, and using the render-wide data to check whether to skip the per-tile vertex shader data and per-tile render data comparison may comprise determining whether the valid flag has a predetermined value. The method may set the valid flag to the predetermined value based on at least one of: data indicating that the render is part of a scene using multiple render targets; and the render comprises more draw calls than a threshold number.

The method may further comprise, for the at least one selected tile of the plurality of tiles, storing iii) per-tile validity data indicating whether to whether to skip the per-tile vertex shader data and per-tile render data comparison, wherein the per-tile validity data may be set based on the number of processed primitives located within that tile.

The per-tile render data may comprise vertex coordinate and vertex state data for each of the processed primitives located within that tile. Storing the representation of the per-tile render data may comprise generating a hash of the vertex coordinate and vertex state data for each of the processed primitives located within that tile and storing the hash value. The vertex state data may comprise data associated with each vertex and used to render the processed primitives in the tile, including one or more of: pixel shader identifiers; varyings; colour data; surface normal data; and texture data.

A second aspect provides a graphics processing system configured to implement a tile-based graphics pipeline in which a rendering space is sub-divided into a plurality of tiles, comprising: geometry processing logic configured to: receive geometry data for a render, the geometry data comprising a plurality of primitives each associated with one or more vertex shader programs; and process the geometry data using the one or more vertex shader programs to generate one or more processed primitives; a tiling unit configured to determine which of the processed primitives are located within each tile; a data characterisation unit configured to, for at least one selected tile of the plurality of tiles, store in a memory i) a representation of per-tile vertex shader data identifying the one or more vertex shader programs used to generate the processed primitives located within that tile, and ii) a representation of per-tile render data characterising data that can be used to render the processed primitives within that tile in subsequent stages of the graphics pipeline; and a testing unit configured to determine, for the or each selected tile, whether the output of a previous render for that tile can be used as an output for the render by comparing the per-tile vertex shader data of that tile with that of the previous render before comparing the per-tile render data of that tile with that of the previous render.

To determine whether the output of the previous render for that tile can be used as the output for the render, the testing unit may be further configured to: determine whether the per-tile vertex shader data matches corresponding per-tile vertex shader data for a previous render; in response to a determination that the per-tile vertex shader data does match, determine whether the per-tile render data of that tile matches corresponding per-tile render data for the previous render; and in response to a determination that the per-tile render data does match, use the output of the previous render for that tile as the output for the render.

To determine whether the output of the previous render for that tile can be used as the output for the render, the testing unit may be further configured to: in response to a determination that the per-tile vertex shader data does not match, cause the graphics pipeline to render that tile. To determine whether the output of the previous render for that tile can be used as the output for the render, the testing unit may be further configured to: in response to a determination that the per-tile render data does not match, cause the graphics pipeline to render that tile.

The data characterisation unit may be further configured to store render-wide data indicating one or more characteristics of the render and, prior to determining whether the output of a previous render for that tile can be used as an output for the render, use the render-wide data to check whether to skip the per-tile vertex shader data and per-tile render data comparison and cause the graphics pipeline to render that tile. The data characterisation unit may be further configured to, for the at least one selected tile of the plurality of tiles, store iii) per-tile validity data indicating whether to whether to skip the per-tile vertex shader data and per-tile render data comparison and render the primitives located within that tile to render the tile, wherein the per-tile validity data is set based on the number of processed primitives located within that tile.

A third aspect provides a graphics processing system configured to perform the above method.

The graphics processing system may be embodied in hardware on an integrated circuit. There may be provided a method of manufacturing, at an integrated circuit manufacturing system, a graphics processing system. There may be provided an integrated circuit definition dataset that, when processed in an integrated circuit manufacturing system, configures the system to manufacture a graphics processing system. There may be provided a non-transitory computer readable storage medium having stored thereon a computer readable description of a graphics processing system that, when processed in an integrated circuit manufacturing system, causes the integrated circuit manufacturing system to manufacture an integrated circuit embodying a graphics processing system.

There may be provided an integrated circuit manufacturing system comprising: a non-transitory computer readable storage medium having stored thereon a computer readable description of the graphics processing system; a layout processing system configured to process the computer readable description so as to generate a circuit layout description of an integrated circuit embodying the graphics processing system; and an integrated circuit generation system configured to manufacture the graphics processing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
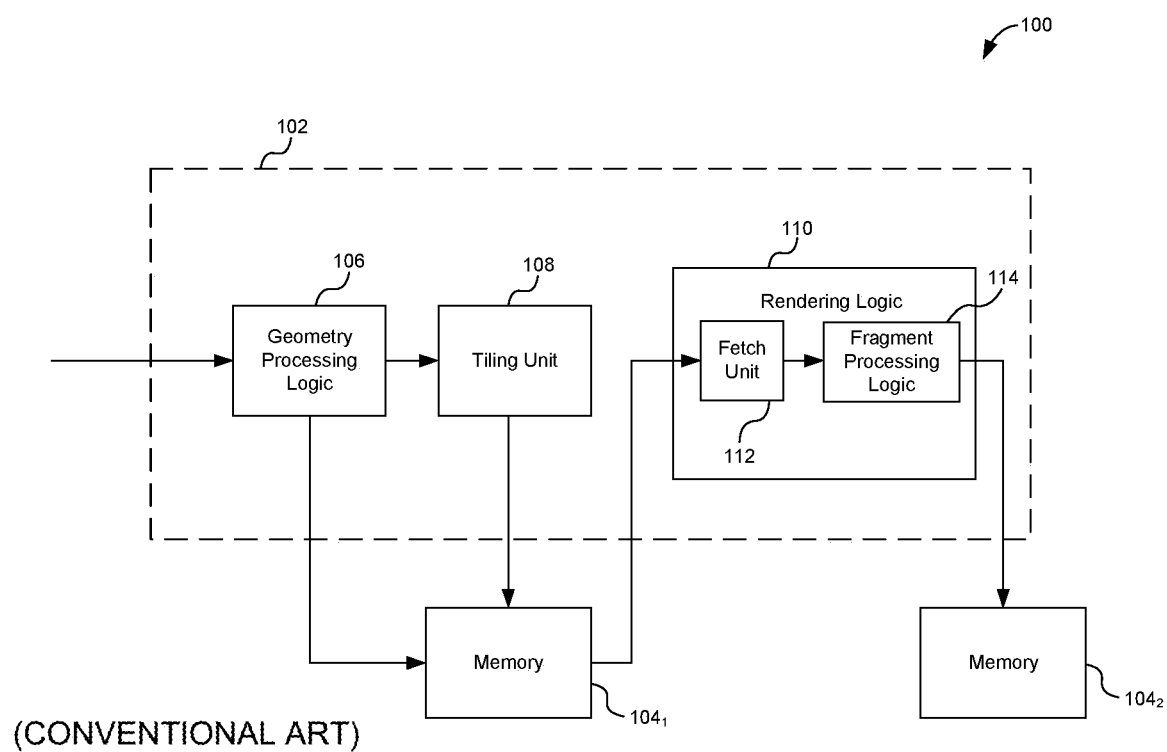
FIG. 1 shows an example of a graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

The present disclosure is directed to techniques for reducing the amount of redundant processing when performing a sequence of renders using a graphics processing system. The graphics processing system comprises a graphics processing unit that identifies when two render operations (belonging to two different renders) will lead to the same rendering output for at least a portion of the image (e.g. for one or more tiles of the image). A render (e.g. of a tile) that is the same as a corresponding previous render (e.g. both renders would result in the same set of rendered values for the tile/image) is referred to herein as a redundant render. The corresponding image, or portion thereof, may be referred to as a redundant image or redundant tile as appropriate.

Figure 3:
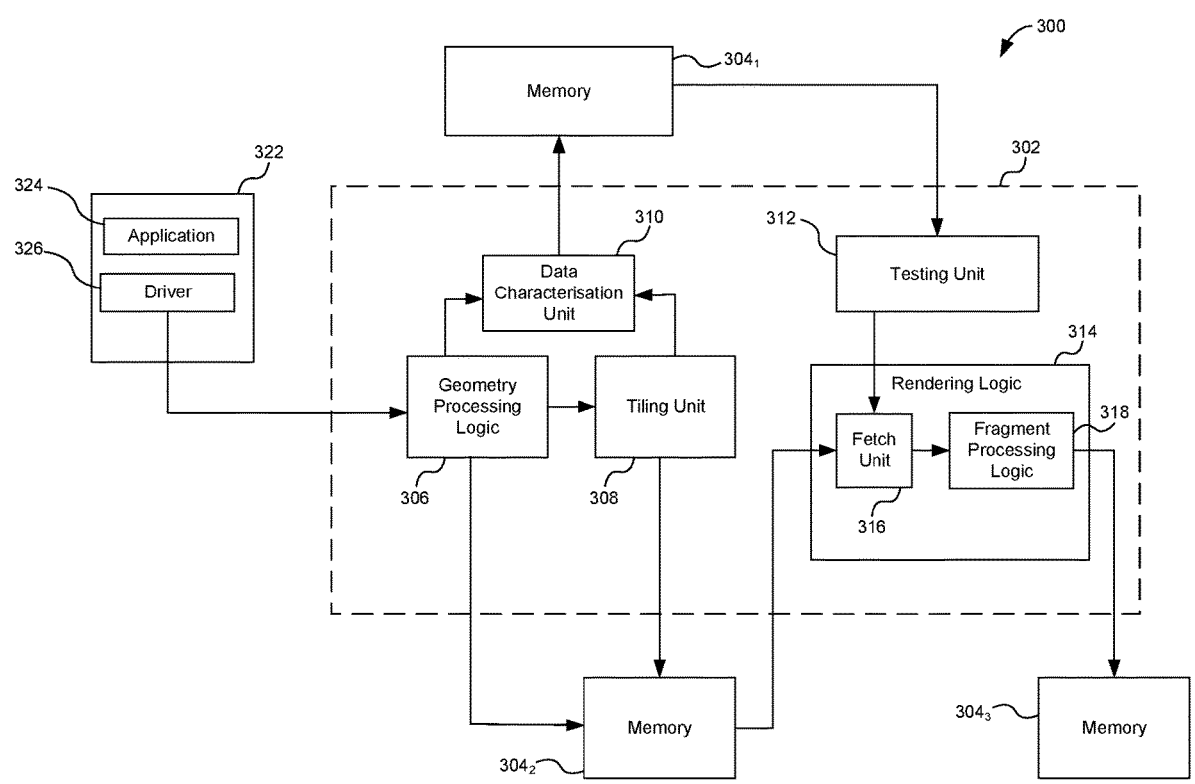
FIG. 3 shows an example of a graphics processing system capable of performing redundancy tests to detect and avoid redundant renders.

FIG. 3 shows an example of a graphics processing system 300 configured to implement the techniques described below for detecting and avoiding redundant renders. The graphics processing system 300 comprises a graphics processing unit 302 and memory blocks $304_{1,2,3}$. Each of the memory blocks is external to the graphics processing unit 302. Each memory block may or may not form part of the same physical memory. The graphics processing unit 302 comprises geometry processing logic 306, a tiling unit 308, a data characterisation unit 310, a testing unit 312, and rendering logic 314. The rendering logic comprises a fetch unit 316 and fragment processing logic 318.

It is noted that the geometry processing logic 306 and the rendering logic 314 are shown as separate components in FIG. 3 because of the different functions they perform, and in some examples they are implemented in physically separate hardware; however, in some other examples, the geometry processing logic 306 and the rendering logic 314 could share processing resources, e.g. such that they are implemented by the same physical processing hardware wherein the processing hardware can switch between operating to perform the functionality of the geometry processing logic 306 and operating to perform the functionality of the rendering logic 314.

The graphics processing unit 302 receives graphics data submitted by an application 324 running on a host computer system 322 (e.g. a CPU). The host computer system 322 further comprises a graphics driver 326. The computer system may execute the application 324 to invoke application instructions. These application instructions may take the form of render requests that are submitted by the application. The render requests may comprise one or more draw calls. A draw call is a command specifying that certain components of the scene (e.g. a portion of the scene) are to be rendered. A draw call may for example specify that one or more geometric items or structures of the scene are to be rendered. One or more such draw calls may need to be executed to perform one render. That is, a single render request submitted by the application may be composed of one or more draw calls.

The render request is received by the driver 326, which causes graphics data associated with the request (and thus the one or more draw calls composing the render request) to be submitted to the graphics unit 302. That graphics data may be stored in external memory (not shown in FIG. 3), or it may be stored within the computer system 322 and submitted directly from the driver 326.

The graphics processing unit 302 operates to perform the render as part of rendering an image of a scene. In order to render a scene, multiple renders may need to be performed by the graphics processing unit. A rendered image may then be formed from the outputs of the multiple renders. Thus, a single render may not correspond directly to a rendered image (though, in some cases it may). To perform the render, the graphics unit may execute the one or more draw calls submitted by the application 324 to render geometry associated with those draw calls to generate rendered image data. The graphics processing unit 302 performs the render in accordance with a graphics pipeline. That is, the graphics processing unit 302 implements a graphics pipeline to render image data. In this example, the graphics pipeline is a tile-based rendering pipeline, such as a tile-based deferred rendering pipeline.

Figure 2:
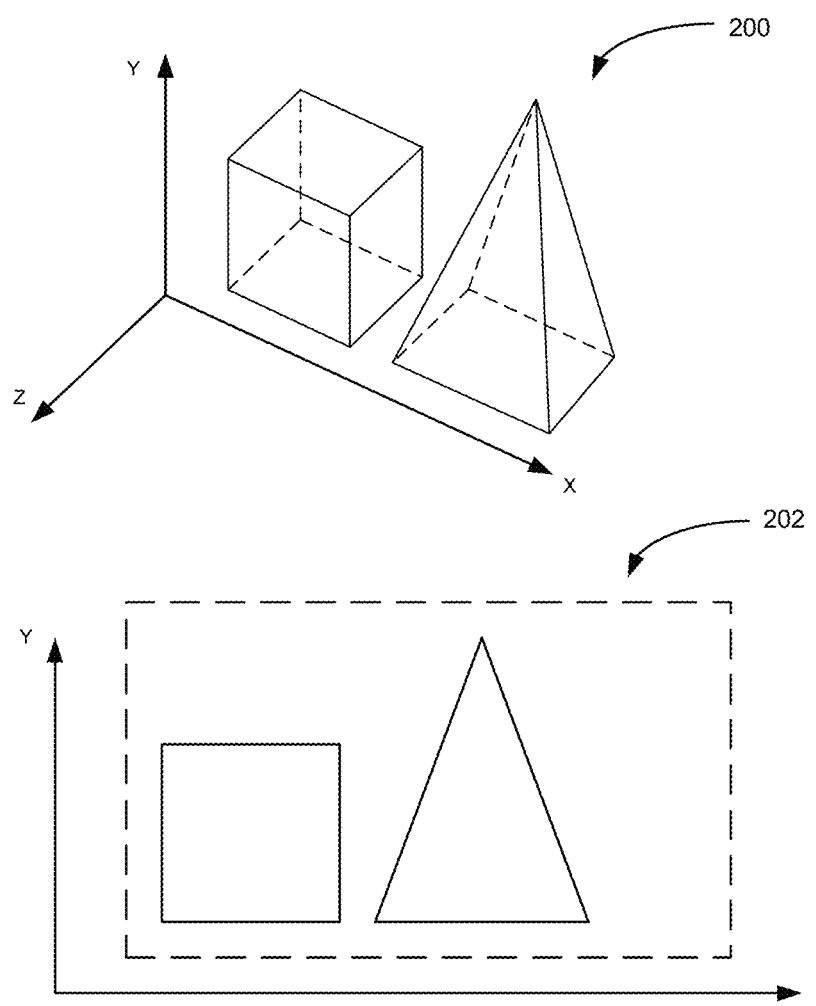
FIG. 2 shows a schematic illustration of the rendering of a scene.
Figure 2:
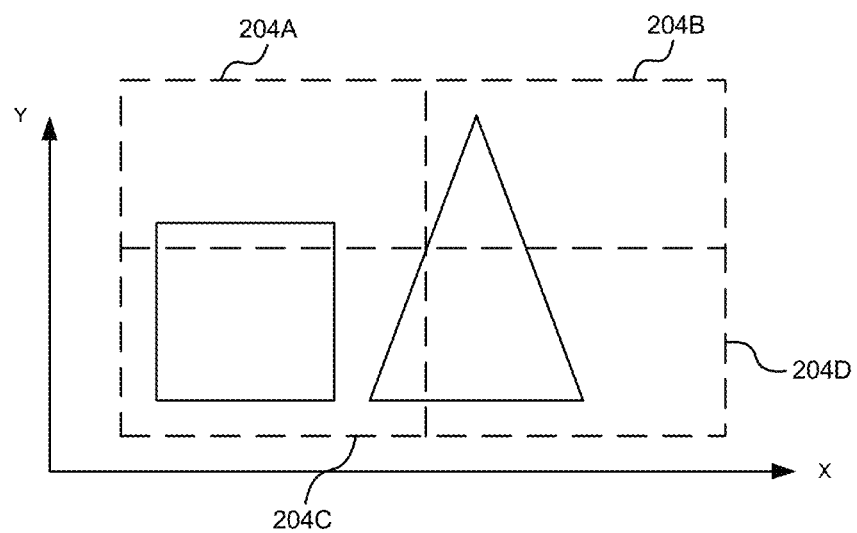

In a geometry processing phase, the geometry processing logic 306 performs geometry processing functions including clipping and culling to remove primitives which do not fall into a visible view. The geometry processing logic 306 may also project the primitives into screen-space (shown schematically in FIG. 2 at 202). The geometry processing logic 306 may also execute one more vertex shader programs on the primitives, which can programmatically manipulate the primitives (e.g. transform them, light them, move them, rotate them, deform them, replicate them, or change them or their associated attributes in any other way). The processed primitives which are output from geometry processing logic 306 are passed to the tiling unit 308 which determines which primitives at least partially intersect/overlap each of the tiles of the rendering space of the graphics processing system 300 (e.g. tiles 204A D). The tiling unit 308 may assign primitives to tiles of the rendering space by creating control streams (or "display lists"/"tile lists") for the tiles, wherein the control stream for a tile includes indications of primitives which are at least partially present within the tile. The processed primitive data is collated and stored in data structures called primitive blocks in the memory $304_2$ (either by the geometry processing logic 306 or the tiling unit 308), and the control streams are output from the tiling unit 308 and stored in the memory $304_2$.

In a rendering phase, the rendering logic 314 renders graphics data for tiles of the rendering space to generate values of a render, e.g. rendered image values. The rendering logic 314 may be configured to implement any suitable rendering technique, such as rasterisation or ray tracing to perform the rendering. In order to render a tile, the fetch unit 316 fetches the control stream for a tile and the primitives relevant to that tile from the primitive blocks from the memory $304_2$. The fragment processing logic 318 may perform operations including hidden surface removal and shading and/or texturing on primitive fragments (i.e. a fragment formed by sampling a primitive) to thereby form the rendered image values for the tile. The texturing and/or shading may be performed by executing suitable fragment shader programs. The rendered image values (e.g. pixel colour values) can then be passed to the memory 3043 for storage. The rendered image can be output from the graphics processing system 300 and used in any suitable manner, e.g. displayed on a display or stored in memory or transmitted to another device, etc.

The graphics processing unit 302 identifies redundant renders by generating and storing information associated with a current render (i.e. a render being performed by the graphics processing unit) and comparing that information with the corresponding information of a previous render (i.e. a render that has been processed prior to the current render). If the information matches across the renders, the current render is identified as redundant. If the information for the renders does not match, the current render is identified as non-redundant. The information for the current render is stored and compared with that of a previous render before the graphics unit completes the current render. In this way, if the current render is identified as being redundant, at least some of the processing necessary to complete that render can be avoided.

It is noted that the previous render may be the render immediately preceding the current render, though it need not be. For example, the current render and the previous render with which the information for the current render is compared may be separated by one or more intermediary renders. In some instances, an image is created from multiple renders of different render types. Examples of render types include render to frame buffer; render to texture, render for shadow mapping etc. In these instances, the previous render may be a previously processed render that is of the same render type as the current render.

Whilst the avoidance of redundant renders is generally desirable, it is also important that the process of generating, storing and comparing information to identify redundant renders does not in itself cause excessive bandwidth use, power consumption and processing delay, such that the benefits of redundant render avoidance are outweighed. In accordance with the examples described herein, the graphics processing unit may implement several different techniques in order to detect redundant renders. These techniques differ from each other by virtue of the type of information that is stored and used to detect that a render is the same as a previous render corresponding to the same region of the image. The techniques may also differ by virtue of the stage of the graphics pipeline implemented by the graphics processing unit at which the information is collected. These techniques aim to optimise the redundant render avoidance by ensuring that the processing for detecting redundant renders is only performed when there is a reasonable likelihood of a redundant render being present, and/or by reducing the amount of computation performed and data stored.

In order to detect a redundant render, information/data about a given render must be analysed. The information that is available about a render differs depending on where in the graphics pipeline the information is read. For example, information about a render can be read prior to the geometry processing phase (denoted pre-geometry phase data) or after the geometry processing phase denoted post-geometry phase data).

Pre-geometry phase data includes the information about a render available prior to the completion of the geometry processing phase (e.g. at the head of the geometry processing phase) and relates primarily to the geometry of the overall scene to be rendered (although may also include information about how to process the fragments later in the pipeline). The information may include both the geometry data and state data associated with one or more draw calls composing the render. If the render is composed from multiple draw calls, each of those draw calls may be associated with its own state data. The submission of a draw call (e.g. from a running application) results in geometry data for that draw call being submitted to the graphics processing unit for processing. Thus, the geometry data received at the graphics processing unit for a particular draw call is associated with the state data for the draw call. This pre-geometry phase state data may include information such as the vertex shader programs that will be applied to the primitives in the geometry processing phase. Additional pre-geometry phase state data may include information such as the number and/or identity of draw calls for the render, information on whether any advanced rendering techniques are used, such as multiple render targets (MRT), and the clear colour for the render (which is the initialisation colour used for the render output—i.e. the colour the output would be in the absence of any primitives being rendered).

Given that the pre-geometry phase data contains all the information needed for the graphics processor to render the scene, it is possible for redundant renders to be detected using only pre-geometry phase data. For example, the geometry data and its associated state data (from the one or more draw calls composing the render) may be compared to the equivalent data for a previous render. This comparison may be done before any geometry processing is performed, and hence could avoid all redundant processing. Alternatively, the geometry processing may be started and the comparison may be done in parallel, such that the results are known prior to the completion of the geometry processing phase for the current render. For example, the comparison may be completed prior to the vertex post-processing stage of the geometry processing phase. If the current and previous renders match, then it can be determined that the current render is redundant prior to performing the vertex post-processing (and all subsequent) stages in the graphics pipeline. However, the pre-geometry phase data relates to the overall scene, i.e. not just a portion of the final render, such as a tile. As a result, the likelihood of this detecting a redundant render is much reduced, as even a small difference to a single primitive within the whole scene would make the data (and the final scene) different. Using this pre-geometry phase data in isolation to detect redundant renders may therefore not be efficient in terms of the gains from avoiding redundant renders versus the amount of processing and storage needed to detect them.

Instead, the pre-geometry phase data may alternatively be compared to the data for a previous render at a subsequent stage of the graphics pipeline. One convenient stage of the pipeline to perform this comparison is at the transition between the geometry processing and rendering phases of a tile-based pipeline (i.e., following the conclusion of the tiling stage for the current render). This allows the data for the current and previous renders to be compared on a per-tile basis. This provides significantly higher granularity and hence higher rates of redundant render detection, as some portions of the scene may have changed and others not. The tiles relating to the unchanged portions of the scene may then be able to be detected as redundant. If the pre-geometry phase data for the current and previous render matches for a given tile (in addition to further information as outlined below), that tile may be determined to be redundant and thus the rendering phase for that tile can be avoided (but not the geometry and tiling processes).

In other examples, post-geometry phase data may be used to compare renders, which becomes available at or towards the end of the geometry processing phase. In these examples, the information may characterise the screen space primitive content of a tile within the rendering space. This information could include for example an indication of which primitives and/or vertices are located within a tile, and information regarding the rendering phase for each of those primitives located within the tile (e.g. which pixel/fragment shaders are required to render each primitive, resources of the graphics processing unit required to render the primitives etc.). This information may again be compared with that for a previous render on a per-tile basis, allowing redundant tiles to be identified prior to the rendering phase. However, the amount of this information (details of all the primitives/vertices per tile, plus associated rendering phase state data) can become very large, and therefore the processing required to analyse and compare this, and store the results, is significant.

The graphics processing unit 302 of FIG. 3 aims to balance the potential gains from avoiding redundant renders with minimising the computation, storage and power consumption requirements of detecting the redundancy. The graphics processing unit 302 comprises a data characterisation unit 310 which receives both pre-geometry phase data (from the geometry processing logic 306) and post-geometry phase data (from the tiling unit 308) and makes a determination as to whether the render is suitable for redundancy testing and, if so, generates and stores data characterising the render in memory 304$_1$. The graphics processing unit 302 further comprises a testing unit 312 which operates at the per-tile rendering stage of the pipeline. The testing unit 312 reads the data about the current and previous tile render from the memory 304$_1$ and, if this indicates that the render is suitable for redundancy testing, then the testing unit 312 compares the data between the current and previous render. If this data matches, then this indicates that the rendering of this tile is redundant and can be skipped and the output from the previous tile render re-used as the current output. The output of the previous render may for example be retrieved from memory, e.g. from a frame buffer, back buffer or an intermediary memory buffer such as a render target. If the render is deemed to be redundant, the testing unit 312 can send a signal to the fetch unit 316 to cause it to not read the control stream and primitive block data from memory (or to cease reading if it has already started), thereby saving memory bandwidth. Likewise, the fragment processing logic 318 does not need to process the fragments/pixels for the tile, saving processing and power consumption.

Two techniques are disclosed herein for achieving these aims. The first technique may be referred to as "pre- then post-geometry phase data comparison". This first technique is described with reference to FIGS. 4 to 7. The second technique may be referred to as "primitive block comparison" and is described with reference to FIGS. 8 to 12. Aspects of the two techniques may also be combined, as will be apparent to the skilled person.

Pre- then Post-Geometry Phase Data Comparison

The "pre- then post-geometry phase data comparison" technique is first described with reference to FIGS. 4 and 5, which illustrate the process for generating and storing the characterisation data for the current render. The redundancy testing process is then described with reference to FIGS. 6 and 7.

Figure 4:
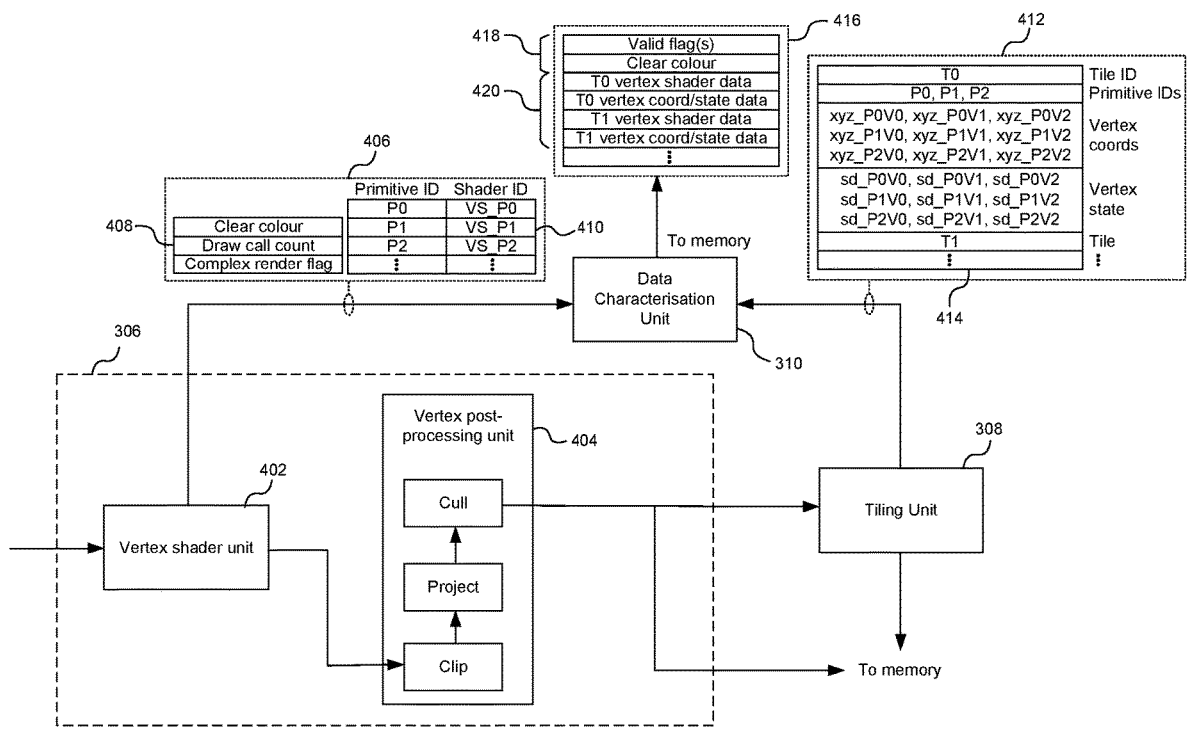
FIG. 4 shows the data provided to and generated by a data characterisation unit according to a first technique.
Figure 5:
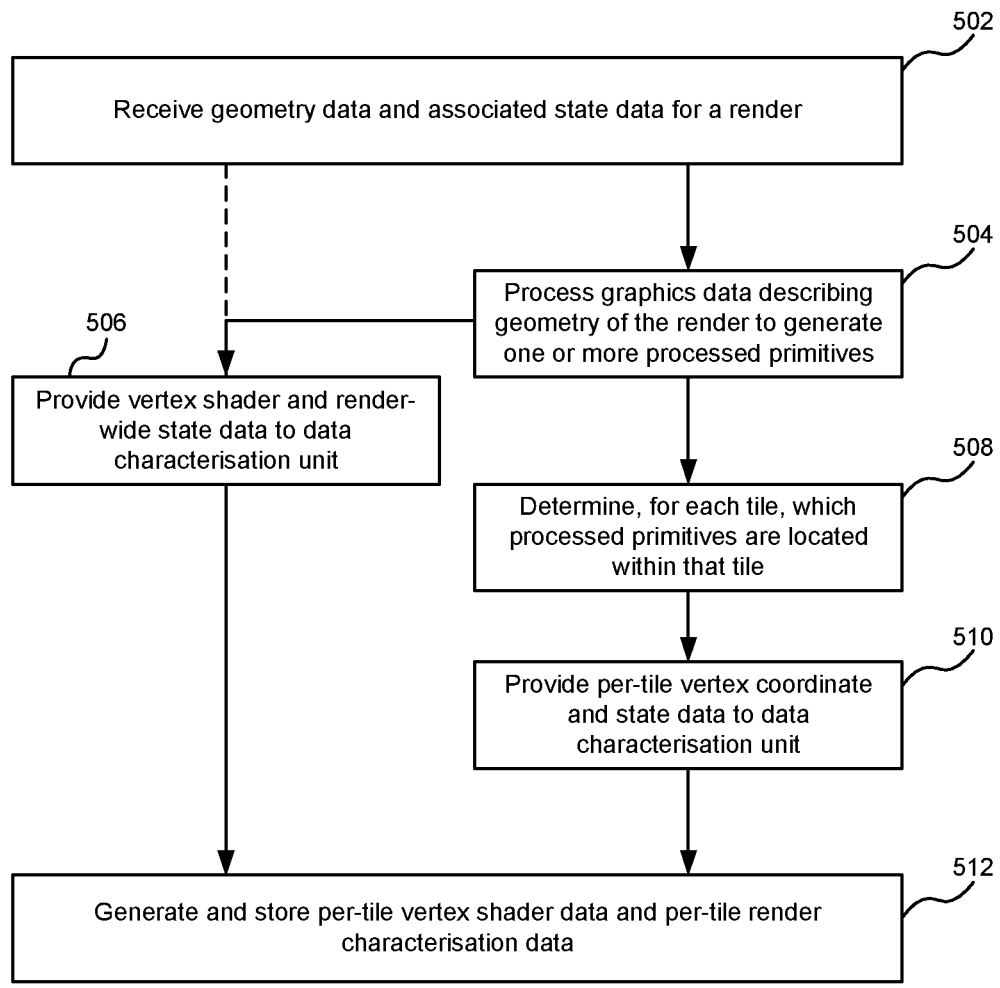
FIG. 5 shows a flowchart for the operation of the system of FIG. 4.

FIG. 4 illustrates in more detail the geometry processing logic 306, tiling unit 308 and data characterisation unit 310 of FIG. 3. In particular, FIG. 4 illustrates the data provided to and generated by the data characterisation unit 310 and stored in memory. The geometry processor logic 306 is shown comprising a vertex shader unit 402 and a vertex post-processing unit 404. In some examples, the geometry processing logic 306 may also comprise a primitive block generator (not illustrated in FIG. 4, but described in more detail with reference to FIG. 8 below). The vertex shader unit 402 receives the primitive data to be processed. The vertex shader unit may execute one or more vertex shaders on the primitive data. The vertex shader unit may for example operate to perform one or more geometry transforms to transform the primitive data from model space to screen space. It may also perform lighting and/or shading operations, or programmatically change them in any suitable way. The transformed vertex data is then output from the shader unit 402 to the vertex post-processing unit 404. The vertex post-processing unit performs a number of operations on the transformed primitive data, including in this example clipping, projection and culling, to generate the processed primitives.

The operation of the system of FIG. 4 is now described with reference to the flowchart of FIG. 5. In step 502, geometry data and associated state data for a render is received at the geometry processing logic 306 within the GPU 302. The geometry data for the render comprises a plurality of primitives describing the surface(s) of the geometric item(s) to be rendered. The primitive data may include vertex data for the one or more input primitives. Each primitive/vertex is associated with some state data describing how the primitives should be rendered through the graphics pipeline. For example, the state data may include information such as the vertex shader programs that will be applied to the primitives/vertices in the geometry processing phase, as well as render-wide data such as the number and/or identity of draw calls for the render, information on whether any advanced rendering techniques are used, such as multiple render targets (MRT), and the clear colour for the render. The state data may further include data relating to how to process the primitives later in the pipeline (e.g. in the rendering phase), such as fragment shaders, vertex varyings, texture information, etc. (where "varyings" are attributes associated with each of the vertices, including for example colour data, normal data, texture coordinates, or any other data that may be used as part of the rasterisation process). As noted above, this geometry data may be submitted by a driver running on a host CPU, and in some examples the data may be submitted directly to the GPU, and in other examples some data may be written to memory and a reference to the memory is submitted to the GPU (optionally along with other data).

It is noted that shaders for the geometry processing phase (e.g. vertex and geometry shaders) typically operate (e.g. are executed) on primitives or vertices of the primitives, whereas shaders for the rendering phase (e.g. pixel/fragment shaders) typically operate (e.g. are executed) on fragments. It also noted that the state data mentioned above is only an example of the state data that may be submitted, and many more data items may also be included. Examples of further state data that may also be received includes one or more of: an indication of the draw call type (e.g. whether the draw call is indexed, instanced etc.); the arguments of the draw call (e.g. the number of vertices of the one or more primitives to be rendered); resources of the graphics processing unit to be used to process the primitive data for the draw call (e.g. an indication of vertex buffers or index buffers to be used); and an indication of the render target state (e.g. the render target blend state or depth stencil state).

In step 504, the geometry processing logic 306 processes the geometry data for the render to generate one or more processed primitives. In particular, the geometry processing logic 306 uses the one or more vertex shader programs associated with the plurality of primitives to process the primitives. Using the one or more vertex shader programs to generate one or more processed primitives may comprise executing the vertex shader program on the data of the associated primitive and/or its associated vertices, which can programmatically alter or manipulate the primitives (e.g. transform them, light them, move them, rotate them, deform them, replicate them, or change them or their associated attributes in any other way). The processed primitives may then be further processed by the vertex post-processing unit 404 (or any other further geometry phase processing block not shown in FIG. 4, such as hull shaders, tessellation and domain shaders). The processed primitives are then provided to the tiling unit 308. Thus, a processed primitive may refer to a primitive that has been one or more of: vertex/geometry shaded, clipped, projected, and subjected to a culling operation.

In step 506, vertex shader and render-wide state data is provided to the data characterisation unit 310. The term "render-wide" is intended to refer to data that applies to the render as a whole, for example to all the primitives of the render. This is distinguished from "per-tile" data, which only applies to a particular tile or primitives within that tile. Examples of the vertex shader data and render-wide state data are shown in pre-geometry phase data block 406 in FIG. 4. Pre-geometry phase data block 406 comprises render-wide state data 408 and vertex shader data 410. In the example of FIG. 4, the render-wide state data 408 comprises data on the render clear colour, a count of the number of draw calls for the render, and a flag indicating whether advanced rendering techniques are used in the render, such as MRT. In the example of FIG. 4, the vertex shader data 410 comprises a data structure that maps an identifier for each primitive (denoted "Primitive ID") to an associated identifier for the vertex shader (denoted "Shader ID"). Note that although FIG. 4 only illustrates one vertex shader mapped to each primitive, in some examples a primitive may have zero or more than one associated shader program.

Note that in some examples, instead of the pre-geometry phase data block 406 being provided by the geometry shader logic 306 to the data characterisation unit 310, it may instead be provided by a unit (not illustrated) earlier in the graphics processing unit or provided directly from the driver. This is illustrated by the dashed line in FIG. 5. Alternatively, part of pre-geometry phase data block 406 may be provided by the geometry shader logic 306 and another part by a portion of the GPU before the geometry shader logic 306 in the graphics pipeline (e.g. the render-wide data 408 is submitted directly by the driver 326 to the data characterisation unit 310 and the vertex shader data 410 is provided by the geometry shader logic 306).

In step 508, the tiling unit 308 determines which of the processed primitives from the geometry shader logic 306 are located within each tile of the plurality of tiles. As used herein, the term "located", as it refers to primitives and tiles, means "at least partially located", i.e. intersects with or overlaps. Thus, a primitive located within a tile may be either partly located within a tile, or wholly located within a tile.

The tiling unit 308 may generate a display list for each tile that indicates which primitives are located within that tile. These display lists may alternatively be referred to as control streams or tile lists. Each display list created by the tiling unit 308 might not actually include the data for the primitives indicated in the list (e.g. the vertex data for the primitives). Instead, each display list may contain an indication of each primitive located within the tile (e.g. the primitive ID in the relevant primitive block). This reduces storage requirements by avoiding the need to store replica copies of primitive data for primitives that are located within more than one tile. The primitive IDs stored in the display lists for each tile can then be used to index the data for that primitive stored within the primitive block(s). The primitives located within a tile may not all belong to a single primitive block, but may in some cases belong to multiple primitive blocks. Thus, the display list for each tile may index one or more primitive blocks. The display lists for each tile are outputted by the tiling unit 308 and stored in the memory.

In step 510, the tiling unit 308 provides per-tile render data to the data characterisation unit 310. Examples of the per-tile render data are shown in post-geometry phase data block 412 in FIG. 4. The post-geometry phase data block 412 of FIG. 4 comprises per-tile render data 414 organised as a list with a tile identifier (denoted "Tile ID") followed by a block of data relating to that tile. In this example, the data relating to each tile includes: a set of primitive identifiers (denoted "Primitive IDs"); a set of vertex coordinates (denoted "Vertex coords"); and a set of vertex state data (denoted "Vertex state"). The primitive IDs for a tile indicate which primitives are located in that tile. The vertex coords list the coordinates (e.g. x, y and z coordinates) for each of the vertices of each primitive in the tile. If the primitives are triangles, then three vertices are present, each having an x,y,z coordinate, for example as denoted in FIG. 4 as xyz_P0V0 for the x,y,z coordinate of vertex 0 in primitive 0, xyz_P0V1 for the x,y,z coordinate of vertex 1 in primitive 0, xyz_P0V2 for the x,y,z coordinate of vertex 2 in primitive 0, etc. The vertex state lists the state data for each of the vertices of each primitive in the tile. If the primitives are triangles, then three vertices are present, each having associated state data, for example as denoted in FIG. 4 as sd_P0V0 for the state data of vertex 0 in primitive 0, sd_P0V1 for the state data of vertex 1 in primitive 0, sd_P0V2 for the state data of vertex 2 in primitive 0, etc. The vertex state data may be associated with the stages of the pipeline yet to have been performed for the current render. In the example of a tile-based graphics pipeline comprising a geometry processing and rendering phase, the state data may be data associated with the rendering stage of the pipeline (since the geometry processing phase has been completed for the primitives). The state data can for example include an indication of which shaders are to be executed in the rendering phase to render the primitives in the tile. The state data can include an indication of the shader IDs, and/or shader resources of the shaders to be executed to render the primitives of the tile. Where state data relates to a primitive (e.g. for rendering), rather than to an individual vertex, the state data for the primitive may be associated with one vertex (e.g. the first vertex) of the primitive. The state data may further include vertex varyings and texture information.

In step 512, the data characterisation unit 310 generates and stores in the memory representations of per-tile vertex shader data and per-tile render data. In some examples, the data characterisation unit 310 also generates and stores in the memory render-wide redundancy data indicating one or more characteristics of the render useful in the redundancy detection described later. The data characterisation unit may cause this information to be stored in external memory block 304$_1$. Alternatively (or additionally), some or all of this information may be stored locally to the graphics processor, for example in registers in the data characterisation unit or in a cache memory. This information will be used to compare the current render with a previous render to determine whether parts or all of the current render are redundant (as will be described in more detail below).

FIG. 4 shows an example data characterisation output block 416 generated by the data characterisation unit 310. The data characterisation output block 416 comprises a header 418 and per-tile characterisation data 420. The header 418 comprises one or more valid flags generated by the data characterisation unit 310, which can be used to indicate whether the current render is suitable for testing for redundant rendering. This can save processing at the testing stage, as described below. In one example, a valid flag can be set to indicate that the whole current render is not suitable for testing for redundant rendering, and hence all the associated redundancy testing can be skipped. This valid flag can be set to a predetermined value by the data characterisation unit 310 based on the render-wide state data 408. For example, the valid flag may be set to a predetermined value if the render-wide state data 408 indicating that the render is part of a scene using multiple render targets (or other advanced rendering techniques) or that the render comprises more draw calls than a threshold number. These are indications that this is a complex render that is unlikely to benefit from redundant rendering testing. In some examples, if the data characterisation unit 310 determines that the valid flag should be set to indicate that the whole current render is not suitable for testing for redundant rendering, then the remainder of the data in the data characterisation output block 416 does not need to be generated and stored.

In further examples, additional valid flags may be set on a per-tile basis. That is, a valid flag is present for each tile in the rendering space, and this is set to a predetermined value to indicate whether that tile is suitable for redundant render testing. The data characterisation unit 310 may set the per-tile valid flag for a given tile based on the number of processed primitives located within that tile, such that if more than a predefined maximum number of the processed primitives are located in that tile, then the valid flag is set to indicate that this tile is not suitable for redundant render testing. This is because a large number of primitives within a tile is an indicator of a complex scene that is unlikely to benefit from redundant rendering testing, and may also need significant processing and storage for the per-tile characterisation data. In examples, it has been found that the predefined maximum number of processed primitives for a tile should be in the range 16 to 64. In some examples, if the data characterisation unit 310 determines that the valid flag for a particular tile should be set to indicate that this tile is not suitable for testing for redundant rendering, then the remainder of the data in the data characterisation output block 416 for this particular tile does not need to be generated and stored Although in the example of FIG. 4 the per-tile valid flags are shown as part of the header, in other examples the valid flags for each tile may be stored in the per-tile characterisation data 420 sections of the data characterisation output block 416, where other data relating to that tile is stored.

The header 418 may also comprise the clear colour for the render. As noted above, the clear colour is a render-wide property, and can be used in the redundancy detection described later.

The per-tile characterisation data 420 comprises sets of data specific to each tile in the rendering space. For example, FIG. 4 illustrates this with a sequence of data items for tile T0, followed by a sequence of data items for T1, etc. However, in other examples, the data can be interleaved such that the values for a particular data item are listed for all the tiles, then the values for another data item are listed for all the tiles etc. As illustrated in the example of FIG. 4, the data characterisation unit 310 generates two sets of characterisation data for each tile: a representation of per-tile vertex shader data, and a representation of per-tile render data.

The per-tile vertex shader data identifies the one or more vertex shader programs used to generate the processed primitives located within that tile. The data characterisation unit 310 generates this information from the vertex shader data 410 that maps the primitive IDs to an associated identifier for the vertex shader and the primitive IDs in each tile from the per-tile render data 414. Therefore, the data characterisation unit 310 is able to map the primitives located in each tile to the vertex shaders used by those primitives to generate a list of the vertex shaders used in each tile. Note that in many cases multiple primitives may use the same vertex shader program, so it may be expected that the list of vertex shaders used to generate the processed primitives in a tile contains fewer entries than there are primitives within the tile. The representation of the per-tile vertex shader data stored by the data characterisation unit 310 may, in one example, be a simple list of the vertex shader IDs used to generate the processed primitives in each tile. In another example, the representation of the per-tile vertex shader data stored by the data characterisation unit 310 may be a hash of the list of the vertex shader IDs used to generate the processed primitives in each tile, as described in more detail below.

The per-tile render data is data that can be used when rendering the processed primitives within that tile in subsequent stages of the graphics pipeline. This is based on the per-tile render data 414 provided by the tiling unit 308. The per-tile render data can comprise the vertex coordinate and vertex state data for each primitive located within a tile, as illustrated in FIG. 4. This data therefore describes exactly where the geometry within the tile is located (from the coordinates) and how it will be rendered in subsequent pipeline stages to the output (from the state data). This enables precise comparison between current and previous tiles in the redundancy test process described later. The representation of the per-tile render data stored by the data characterisation unit 310 may be a direct copy of the vertex coordinate and vertex state data from the per-tile render data 414. However, in other examples, the representation of the per-tile render data stored by the data characterisation unit 310 may be a hash of the vertex coordinate and vertex state data from the per-tile render data 414.

Note that the example arrangement of data shown in FIG. 4 is an illustrative example only, and the data can be structured in any suitable manner.

As noted above, the representations of the per-tile vertex shader data and per-tile render data may be in the form of a hash of the original data. The benefit of using a hash is that it reduces the storage requirements, as the hash is smaller than the original data, and in some examples can be of a fixed size irrespective of the size of the original data. The data characterisation unit 310 may be configured to store either or both of the per-tile vertex shader data and per-tile render data in the form of one or more hash representations. The data characterisation unit 310 may generate the hash values by implementing a hash function. Many well-known hash functions exist, such as XOR-based functions, cyclic redundancy check (CRC) based functions, as well as more complex schemes such as MD5, SHA-1, and SHA-2.

In one example, the per-tile render data may be hashed on a per-primitive basis; i.e. the vertex coordinate and/or state data for each primitive located within the tile may be used to generate a respective hash value per primitive. In this case, the hash function implemented by the data characterisation unit 310 may generate a hash value as a function of vertex data for a single primitive. Thus, in this case, the data characterisation unit stores, for each tile, a number of hash values in the memory block $304_1$ equal in number to the number of primitives determined to be located in that tile. The data characterisation unit 310 may therefore cause hashed per-tile render data to be stored in the memory block $304_1$, where the hashed per-tile render data comprises a set of one or more hash values for each tile, wherein for example each hash value corresponds to a respective primitive located in the tile.

In another example, the per-tile render data may be hashed on a per-tile basis. That is, a single hash value may be generated for each tile in dependence on the per-tile render data for all of the primitives located within that tile (i.e. based on all of the vertex coordinate and/or state data for all the primitives located within the tile). Thus, in this case, the hash function implemented by the data characterisation unit 310 may generate a single hash value as a function of the per-tile render data for all the primitives located within the tile. Generating a single vertex hash value per tile has the advantage of further reducing the storage requirements of the vertex data for each tile.

In a further example, both the per-tile vertex shader data and per-tile render data may be hashed together on a per-tile basis. That is, a single hash value may be generated for each tile in dependence on both the per-tile vertex shader data and per-tile render data for all of the primitives located within that tile (i.e. based on all of the vertex shader data, vertex coordinate and/or state data for all the primitives located within the tile). In yet further examples, the per-tile vertex shader data and per-tile render data may be hashed separately on a per-tile basis, and the hash values stored separately.

Although storing the per-tile vertex shader data and/or per-tile render data in the form of one or more hash values does reduce the storage requirements in the memory block $304_1$, it still requires that the data characterisation unit 310 perform multiple hash calculations, consuming processing resources of the graphics processing unit.

Figure 6:
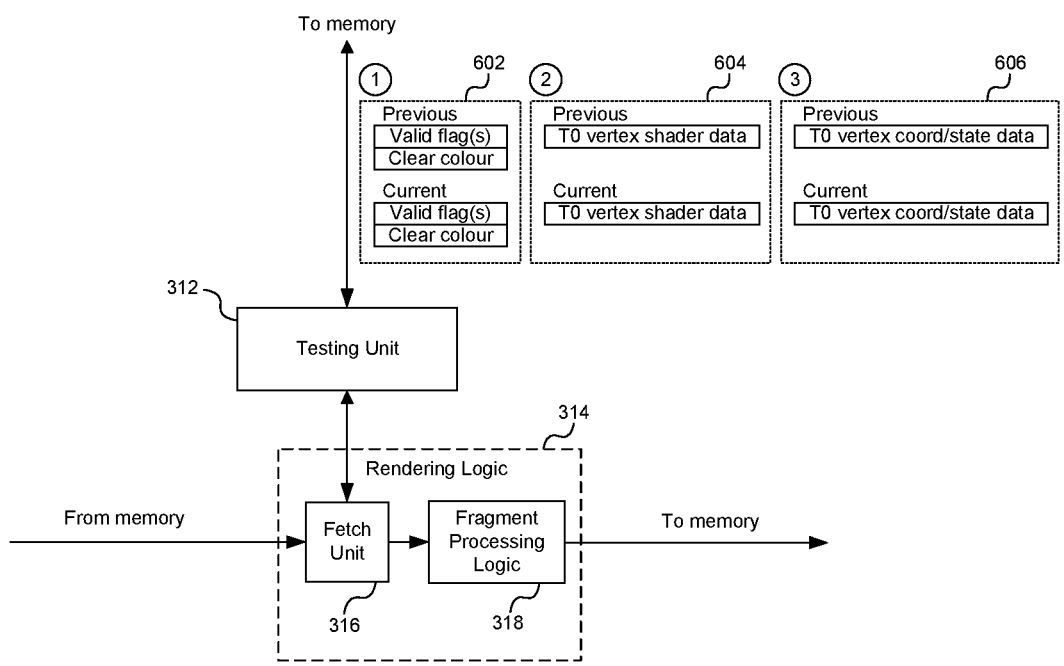
FIG. 6 shows the data provided to and analysed by a testing unit according to the first technique.
Figure 7:
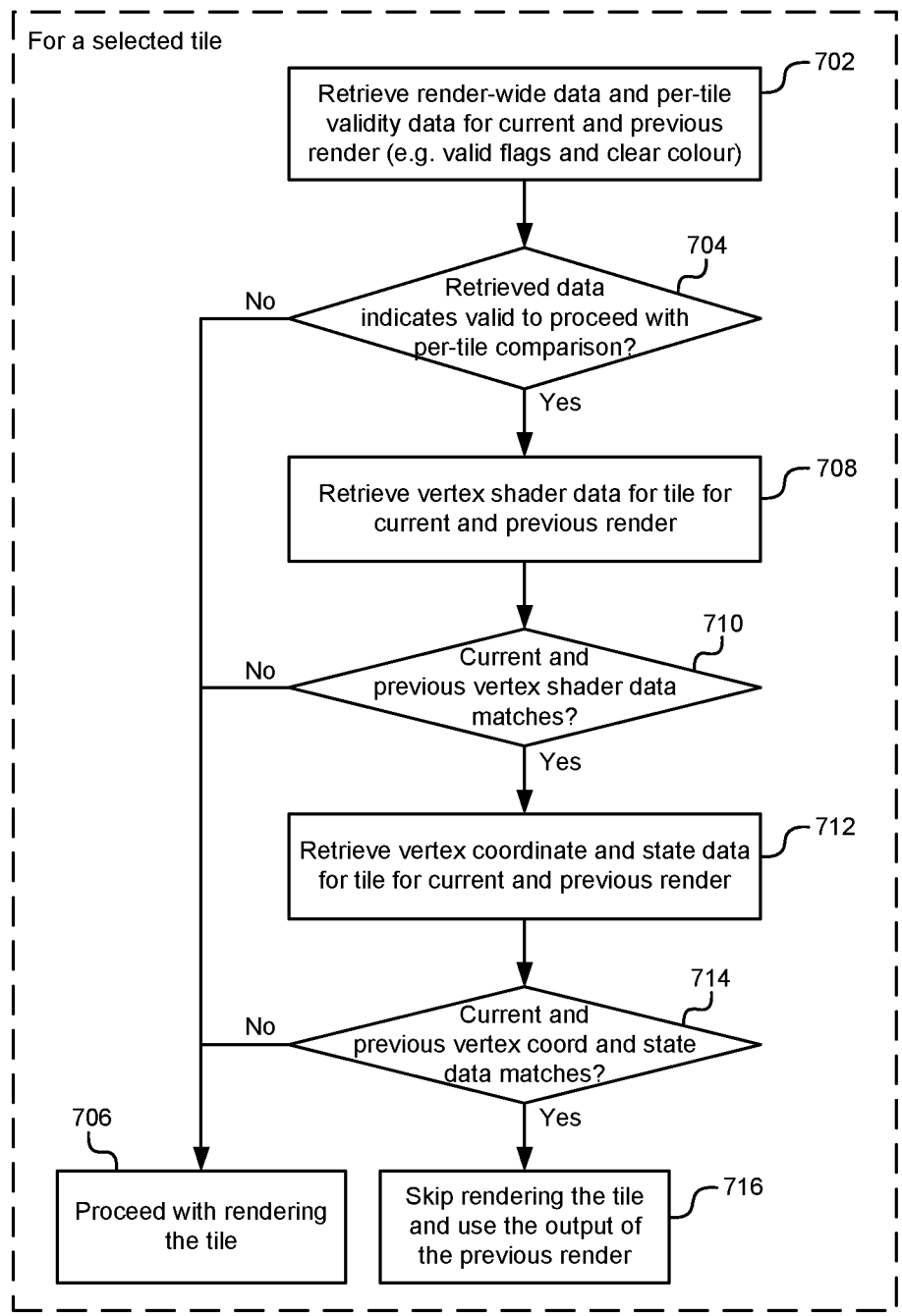
FIG. 7 shows a flowchart for the operation of the system of FIG. 6.

Reference is now made to FIG. 6 and FIG. 7, which show the data provided to and analysed by the testing unit 312 according to the "pre- then post-geometry phase data comparison" technique, and a flowchart illustrating how this operates.

FIG. 6 illustrates in more detail the rendering phase functionality including the testing unit 312, rendering logic 314, fetch unit 316 and fragment processing logic 318 of FIG. 3. In particular, FIG. 6 illustrates the data retrieved from memory and analysed by the testing unit 312 to determine whether the rendering of a particular tile is redundant. The testing unit 312 is configured to retrieve from memory and analyse various data items relating to the tile's current and previous render in a multi-stage process, and use this to determine whether the current render is redundant. In other words, the testing unit 312 determines whether the output of a previous render for that tile can be used as an output for the render.

In one example, the fetch unit 316 is configured to wait for the analysis to complete at the testing unit 312 before fetching the rendering data for the tile being rendered (i.e. the display list and associated primitive data). If the testing unit 312 determines that the render of the current tile is not redundant (i.e. needs to be rendered) then the testing unit 312 provides a signal to the fetch unit 316, which can initiate fetching the rendering data for the tile, and provide this to the fragment processing logic 318 which will perform the fragment shading, texturing etc. to render the tile and generate the output. Conversely, if the testing unit 312 determines that the render of the current tile is redundant (i.e. does not need to be rendered) then the testing unit 312 provides a signal to the fetch unit 316 indicating that the tile rendering data does not need to be fetched from memory. This information (which may be provided by the testing unit 312 or the fetch unit 316) is used by the rendering logic 314 and causes the rendering logic to retain in the memory the output of the previous render for the tile, and use this data as the output data for the current render for the tile.

In another example, to avoid the testing unit 312 stalling the graphics pipeline, the fetch unit 316 is configured to proceed with fetching the rendering data for the tile being rendered, without waiting for the testing unit 312 to complete the analysis. In this way, more memory bandwidth is potentially used, but the performance is improved. If the testing unit 312 determines that the render of the current tile is not redundant (i.e. needs to be rendered) then the fetch unit 316 continues fetching the rendering data for the tile, and provides this to the fragment processing logic 318 which will perform the fragment shading, texturing etc. to render the tile and generate the output. If the testing unit 312 determines that the render of the current tile is redundant (i.e. does not need to be rendered) then the testing unit 312 provides a signal to the fetch unit 316 indicating that the fetch of the tile rendering data should be ceased/interrupted, as the data is no longer needed. As above, this information (which may be provided by the testing unit 312 or the fetch unit 316) is used by the rendering logic 314 and causes the rendering logic to retain in the memory the output of the previous render for the tile, and use this data as the output data for the current render for the tile.

The operation of the testing unit 312 and the sequence of redundancy data used by the testing unit to efficiently determine whether a tile render is redundant is now described with reference to FIG. 6 in conjunction with FIG. 7.

For a selected tile that is being tested for redundancy prior to rendering, the testing unit 312 begins retrieving data from the data characterisation output block 416 that was stored in the memory by the data characterisation unit 310. However, because the data characterisation output block 416 is potentially a large block of data, the testing unit 312 may retrieve the data in a multi-stage process, in order to reduce the memory bandwidth and power consumption. In particular, this multi-stage process aims to quickly and efficiently identify many non-redundant tile renders without incurring significant memory bandwidth or computation costs.

In step 702, in a first stage, the testing unit 312 retrieves data from the header 418 of the data characterisation output block 416, for both the current render and the previous render. The retrieved header data may be in the form of render-wide data and per-tile validity data. For example, as shown in FIG. 6, in this first stage, the testing unit 312 retrieves a first data block 602 comprising one or more valid flags and the clear colour for the current and previous render. The valid flags may comprise either or both of the render-wide valid flag and the per-tile valid flag for the tile being tested, as described above.

In step 704, the testing unit 312 determines whether the data retrieved in the first data block 602 indicates that it is valid to proceed with a per-tile comparison of more detailed render data. In the example of FIG. 6, the testing unit 312 determines this by checking whether the relevant valid flags indicate that both the previous and current render data is suitable for redundancy testing. For example, the testing unit 312 can check the render-wide valid flag is not set for the current and previous render (e.g. indicating that neither render used complex rendering features or comprises too many draw calls). The testing unit 312 may also check whether the per-tile valid flag for this tile is set for either of the current and previous render (e.g. indicating that too many primitives are located in the tile). In the example of FIG. 6, the testing unit 312 further determines whether the clear colours for the current and previous renders match, by comparing the two values.

If any of the valid flags indicate the tile is not valid for redundancy testing, or the clear colours do not match, then this indicates that no further comparisons should be made by the testing unit, as the tile is either not redundant or not suitable for redundancy testing. In this case, in step 706, the tile is rendered as normal by the rendering phase of the GPU. Importantly, this decision can eliminate many non-suitable tiles from the redundancy testing process with only a very small amount of data being retrieved, and with very minor processing overhead. This therefore does not significantly degrade performance of the GPU.

If the render-wide data and per-tile validity data indicates that it is valid to proceed with a more detailed per-tile comparison to detect redundancy, then the process moves to the second stage in step 708 in which the testing unit retrieves a first portion of the per-tile characterisation data 420 from the data characterisation output block 416. In step 708, the testing unit 312 retrieves vertex shader data for the tile for both the current and previous render. For example, as shown in FIG. 6, if the tile being tested is T0, then a second data block 604 is retrieved that includes the T0 vertex shader data for both the current and previous render. As described above, the per-tile vertex shader data includes information on the identity of the vertex shaders that were used in the geometry phase to process the primitives that are located in the tile being tested. As noted above, this is usually a small amount of data (at least for tiles that have passed the first stage of not including too many primitives), and in some examples may be in the form of hashed data.

In step 710, the testing unit 312 compares the retrieved data to determine whether the per-tile vertex shader data from the current and previous render matches. If the per-tile vertex shader data from the current and previous render does not match, then this indicates that the geometry in the tile for the current and previous render were generated in different ways (with different shaders) and hence the tile is highly unlikely to be redundant. In this case, the process moves to step 706 and the tile is rendered as normal in the rendering phase. Notably, this is a decision that can identify tiles that are highly likely to not be redundant using a small amount of data and a simple logical comparison, thereby without substantial bandwidth, power or processing overhead.

If the per-tile vertex shader data from the current and previous render does match, then the process moves to the third stage. The third stage is a comprehensive comparison of the redundancy data to confirm whether the tile is redundant, using a second portion of the per-tile characterisation data 420 from the data characterisation output block 416. In step 712, the testing unit 312 retrieves the vertex coordinate and state data for the tile for the current and previous render. For example, as shown in FIG. 6, if the tile being tested is T0, then a third data block 606 is retrieved that includes the T0 vertex coordinate and state data for both the current and previous render. As described above, the vertex coordinate and state data for the tile provides information on where the vertices of the primitives in the tile are located, and how the primitive will be rendered in the rendering phase. This therefore enables an accurate comparison of whether the content of the tile is indeed identical to that of the previous render.

In step 714, the testing unit 312 compares the retrieved data to determine whether the per-tile vertex coordinate and state data from the current and previous render matches. If the per-tile vertex coordinate and state data does not match, then the content of the tile in the current and previous render is not identical, and therefore the tile is not redundant. In this case, in step 706, the tile is rendered as normal in the rendering phase. If the per-tile vertex coordinate and state data does match, then, in step 716, it is determined that the tile is redundant, and the rendering of the tile can be skipped (or at least a portion of the processing avoided) in the rendering phase. In this case, the output of the previous render can be used as the output of the current render, as described above.

As noted above, in some examples, the per-tile vertex coordinate and state data retrieved may be in the form of hashed data. The testing unit 312 may require that the one or more hash values for the tile match exactly to determine that the tile of the current render is redundant. If the information characterising the primitive content of a tile is in the form of multiple hash values, each of those hash values may have to match a corresponding hash value for the tile stored for the previous render in order for the testing unit 312 to determine that the primitive content matches.

The amount of data retrieved for the vertex coordinate and state data for the tile is larger than in the other stages of the redundancy testing. However, without comparing this data an accurate decision on redundancy cannot be made. The impact of this on the performance/power consumption of the GPU is mitigated through the multi-stage testing process described above. By ensuring that unsuitable or non-redundant tiles are eliminated from the testing process early and with small amounts of redundancy data and simple comparisons, the retrieval of larger amounts of data needed for an accurate comparison are minimised.

Primitive Block Comparison

The second technique, "primitive block comparison", is now described with reference to FIGS. 8 and 9, which illustrate the process for generating and storing the characterisation data for the current render. The redundancy testing process for this technique is then described with reference to FIGS. 10 and 11.

Figure 8:
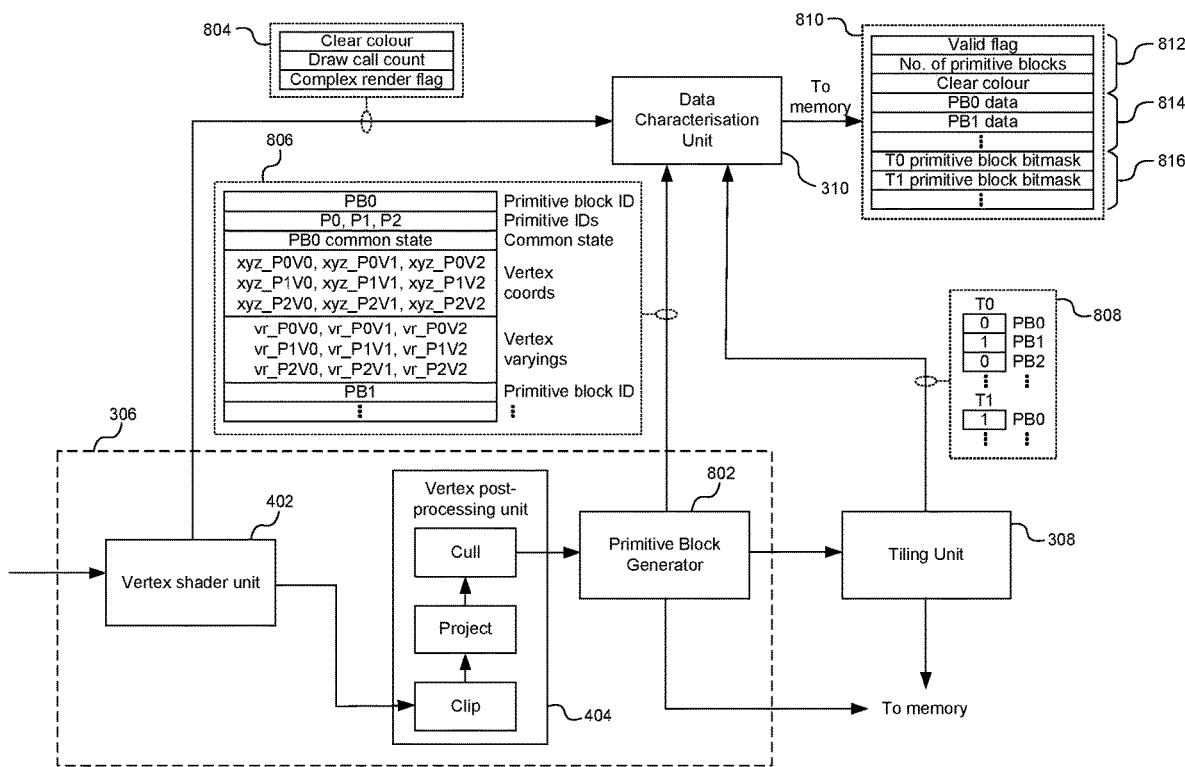
FIG. 8 shows the data provided to and generated by a data characterisation unit according to a second technique.
Figure 9:
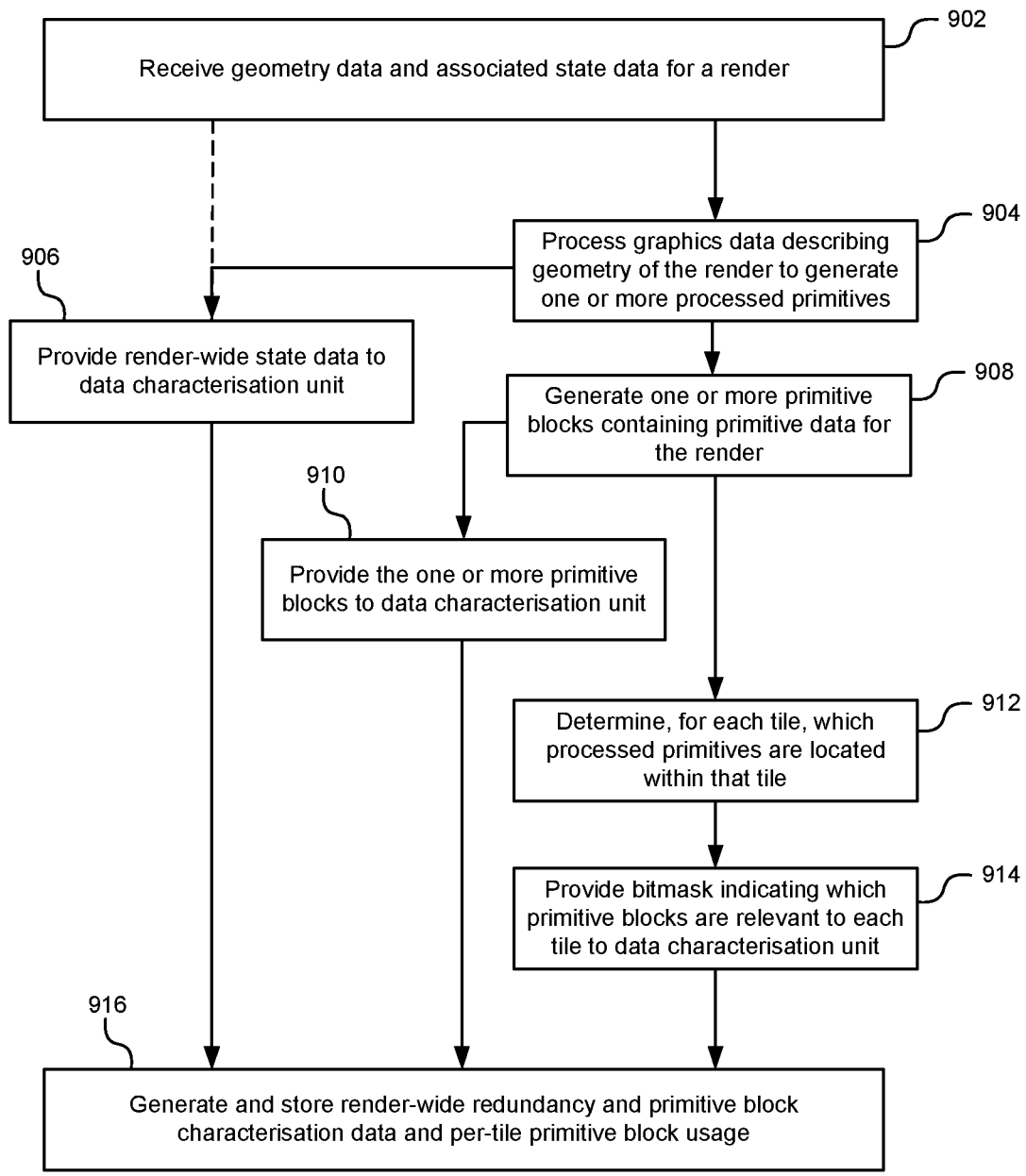
FIG. 9 shows a flowchart for the operation of the system of FIG. 8.

FIG. 8 illustrates in more detail the geometry processing logic 306, tiling unit 308 and data characterisation unit 310 of FIG. 3. In particular, FIG. 8 illustrates the data provided to and generated by the data characterisation unit 310 and stored in memory. The geometry processing logic 306 is shown comprising a vertex shader unit 402 and a vertex post-processing unit 404 (as described above with reference to FIG. 4). The geometry processing logic 306 also comprises a primitive block generator 802. The vertex shader unit 402 receives the primitive data to be processed. The vertex shader unit may execute one or more vertex shaders on the primitive data. The vertex shader unit may for example operate to perform one or more geometry transforms to transform the primitive data from model space to screen space. It may also perform lighting and/or shading operations, or programmatically change them in any suitable way. The transformed vertex data is then output from the shader unit 402 to the vertex post-processing unit 404. The vertex post-processing unit performs a number of operations on the transformed primitive data, including in this example clipping, projection and culling, to generate the processed primitives.

The processed primitives output from the vertex post-processing unit 404 are input into primitive block generator 802. The primitive block generator 802 operates to group the generated processed primitives into one or more sets and generate a primitive block from each set to form one or more primitive blocks. A primitive block is a data structure generated for storing in memory that contains data for a set of primitives and may be accessed by later stages of the pipeline when the primitive data is needed. The data may for example be vertex data (e.g. screen-space coordinates of the vertices and vertex varyings for each primitive in the set for that primitive block). The primitive block may further contain an index of each primitive within the block (e.g. a primitive ID for each primitive in the block).

In one example, the grouping of the primitives into sets for forming into primitive blocks may be performed on the basis of common state data. That is, grouping the primitives may comprise identifying primitives having state data in common and storing in the primitive block vertex coordinates and vertex varyings for the identified primitives in association with the common state data. By grouping the primitives by common state data, such common state data may be stored once within the primitive block rather than separately for each primitive. This enables a saving in the amount of data that needs to be stored and hence the read/write memory bandwidth. This saving may be significant, especially as many objects in a scene can be formed from many hundreds of primitives, all of which may share a common state.

Each primitive block may itself be associated with a primitive block ID (e.g. to enable different primitive blocks to be distinguished and identifiable from each other). Primitive data for all of the processed primitives generated by the vertex post-processing unit 404 may be stored within the one or more primitive blocks. That is, the one or more primitive blocks generated by the primitive block generator 802 may contain all of the processed primitives generated by the vertex post-processing unit 404. The primitive blocks generated by the primitive block generator 802 are input into the tiling unit 308 and written to external memory block $304_2$.

The operation of the system of FIG. 8 is now described with reference to the flowchart of FIG. 9. In step 902, geometry data and associated state data for a render is received at the geometry processing logic 306 within the GPU 302. The geometry data for the render comprises a plurality of primitives describing the surface(s) of the geometric item(s) to be rendered. The primitive data may include vertex data for the one or more input primitives. Each primitive is associated with some state data describing how the primitives should be rendered through the graphics pipeline. For example, the state data may include information such as the vertex shader programs that will be applied to the primitives in the geometry processing phase, as well as render-wide data such as the number and/or identity of draw calls for the render, information on whether any advanced rendering techniques are used, such as multiple render targets (MRT), and the clear colour for the render. The state data may further include data relating to how to process the primitives later in the pipeline (e.g. in the rendering phase), such as fragment shaders, vertex varyings, texture information, etc. (where "varyings" are attributes associated with each of the vertices, including for example colour data, normal data, texture coordinates, or any other data that may be used as part of the rasterisation process). As noted above, this geometry data may be submitted by a driver running on a host CPU, and in some examples the data may be submitted directly to the GPU, and in other examples some data may be written to memory and a reference to the memory is submitted to the GPU (optionally along with other data).

It is noted that shaders for the geometry processing phase (e.g. vertex and geometry shaders) typically operate (e.g. are executed) on primitives or vertices of the primitives, whereas shaders for the rendering phase (e.g. pixel/fragment shaders) typically operate (e.g. are executed) on fragments. It also noted that the state data mentioned above is only an example of the state data that may be submitted, and many more data items may also be included. Examples of further state data that may also be received includes one or more of: an indication of the draw call type (e.g. whether the draw call is indexed, instanced etc.); the arguments of the draw call (e.g. the number of vertices of the one or more primitives to be rendered); resources of the graphics processing unit to be used to process the primitive data for the draw call (e.g. an indication of vertex buffers or index buffers to be used); and an indication of the render target state (e.g. the render target blend state or depth stencil state).

In step 904, the geometry processing logic 306 processes the geometry data for the render to generate one or more processed primitives. In particular, the geometry processing logic 306 uses the one or more vertex shader programs associated with the plurality of primitives to process the primitives. Using the one or more vertex shader programs to generate one or more processed primitives may comprise executing the vertex shader program on the data of the associated primitive and/or its associated vertices, which can programmatically alter or manipulate the primitives (e.g. transform them, light them, move them, rotate them, deform them, replicate them, or change them or their associated attributes in any other way). The processed primitives may then be further processed by the vertex post-processing unit 404 (or any other further geometry phase processing block not shown in FIG. 8, such as hull shaders, tessellation and domain shaders). The processed primitives are then provided to the primitive block generator 802.

In step 906, render-wide state data is provided to the data characterisation unit 310. As detailed above, the term "render-wide" is intended to refer to data that applies to the render as a whole, for example to all the primitives of the render. This is distinguished from "per-tile" data, which only applies to a particular tile or primitives within that tile. Examples of the render-wide state data are shown in pre-geometry phase data block 804 in FIG. 8. Pre-geometry phase data block 804 comprises data on the render clear colour, a count of the number of draw calls for the render, and a flag indicating whether advanced rendering techniques are used in the render, such as MRT.

Note that in some examples, instead of the pre-geometry phase data block 406 being provided by the geometry shader logic 306 to the data characterisation unit 310, it may instead be provided by a unit (not illustrated) earlier in the graphics processing unit or provided directly from the driver. This is illustrated by the dashed line in FIG. 9. Alternatively, part of pre-geometry phase data block 804 may be provided by the geometry shader logic 306 and another part by a portion of the GPU before the geometry shader logic 306 in the graphics pipeline.

In step 908, the primitive block generator 802 generates one or more primitive blocks containing primitive data for the render. As described above, the primitive block generator 802 may do this by identifying primitives with state data in common and grouping these such that their vertex data is stored within a primitive block in association with the common state data. In step 910, the primitive block generator 802 provides the generated primitive blocks to the data characterisation unit 310. FIG. 8 shows example primitive blocks 806 provided to the data characterisation unit 310 from the primitive block generator 802. The primitive blocks 806 comprise a primitive block identifier (denoted "Primitive block ID") followed by a block of data relating to that primitive block. The block of data relating to the primitive block may comprise: a list identifying the primitives in the primitive block (denoted "Primitive IDs"); the state data that is common to all these primitives (denoted "Common state"); a set of vertex coordinates (denoted "Vertex coords"); and a set of vertex varying data (denoted "Vertex varyings").

In the example of a tile-based graphics pipeline comprising a geometry processing and rendering phase, the common state data may be data associated with the rendering stage of the pipeline (since the geometry processing phase has been completed for the primitives). The common state data can for example include an indication of which shaders are to be executed in the rendering phase to render the primitives in the primitive block. The common state data can include an indication of the shader IDs, and/or shader resources of the shaders to be executed to render the primitives in the primitive block. The vertex coords list the coordinates (e.g. x, y and z coordinates) for each of the vertices of each primitive in the primitive block. If the primitives are triangles, then three vertices are present, each having an x,y,z coordinate, for example as denoted in FIG. 8 as xyz_P0V0 for the x,y,z coordinate of vertex 0 in primitive 0, xyz_P0V1 for the x,y,z coordinate of vertex 1 in primitive 0, xyz_P0V2 for the x,y,z coordinate of vertex 2 in primitive 0, etc. The vertex varyings lists the varying data for each of the vertices of each primitive in the primitive block. The vertex varyings can be considered state data that varies per vertex, and hence cannot be separated into the common state data. If the primitives are triangles, then three vertices are present, each having associated varying data, for example as denoted in FIG. 8 as sd_P0V0 for the state data of vertex 0 in primitive 0, sd_P0V1 for the state data of vertex 1 in primitive 0, sd_P0V2 for the state data of vertex 2 in primitive 0, etc.

In step 912, the tiling unit 308 determines which of the processed primitives from the geometry shader logic 306 are located within each tile of the plurality of tiles. As used herein, the term "located", as it refers to primitives and tiles, means "at least partially located", i.e. intersects with or overlaps. Thus, a primitive located within a tile may be either partly located within a tile, or wholly located within a tile.

The tiling unit 308 may generate a display list for each tile that indicates which primitives are located within that tile. These display lists may alternatively be referred to as control streams or tile lists. Each display list created by the tiling unit 308 might not actually include the data for the primitives indicated in the list (e.g. the vertex data for the primitives). Instead, each display list may contain an indication of each primitive located within the tile (e.g. the primitive ID in the relevant primitive block). This reduces storage requirements by avoiding the need to store replica copies of primitive data for primitives that are located within more than one tile. The primitive IDs stored in the display lists for each tile can then be used to index the data for that primitive stored within the primitive block(s). The primitives located within a tile may not all belong to a single primitive block, but may in some cases belong to multiple primitive blocks. Thus, the display list for each tile may index one or more primitive blocks. The display lists for each tile are outputted by the tiling unit 308 and stored in the memory.

In step 914, the tiling unit 308 provides to the data characterisation unit 310 an indication of which primitive blocks are relevant to each tile. In other words, the tiling unit 308 indicates, for each tile, which primitive blocks contain at least one primitive that is located within that tile. This indication may be in the form of a per-tile primitive block list indicating which of the one or more primitive blocks contain at least one primitive that is located within that tile. FIG. 8 illustrates an example primitive block list 808 generated by the tiling unit 308 and provided to the data characterisation unit 310. The primitive block list 808 is in the form of a bitmask (i.e. a string of bits) for each tile, where the position of a bit within the bitmask indicates the identity of the primitive block, and the value of the bit (one or zero) indicates whether that primitive block contains primitives located within that tile. For example, using the illustration of FIG. 8, the primitive block list 808 may contain a first bitmask relating to tile 0 (TO in FIG. 8). This first bitmask has a zeroth bit (if counting from zero) set to 0, indicating that primitive block 0 (PB0 in FIG. 8) does not contain primitives located within tile 0. The first bitmask then has a first bit set to 1, indicating that primitive block 1 (PB1 in FIG. 8) does contain at least one primitive that is located within tile 0. The first bitmask then has a second bit set to 0, indicating that primitive block 2 (PB2 in FIG. 8) does not contain primitives located within tile 0. The bitmask may contain further bits corresponding to further primitive blocks, and this bitmask may therefore be the length of the number of primitive blocks generated by the primitive block generator 802. In some examples (as described below) there may be a predefined limit for the number of primitive blocks in a render above which redundancy testing will not be performed, in which case the bitmasks may be limited in length accordingly. The primitive block list 808 may then further contain a second bitmask relating to tile 1 (T1 in FIG. 8). This second bitmask has a zeroth bit set to 1, indicating that primitive block 0 (PB0 in FIG. 8) does contain primitives located within tile 1. Further bits may be present in the bitmasks, and further bitmasks may be present for further tiles.

The benefit of using a bitmask such as described above is that it is a very compact and efficient data structure. It requires very little storage and is fast and efficient to access and interpret the data. It also requires minimal overhead at the tiling unit 308 to build and provide this data, as the tiling unit 308 is already determining which primitives are located in which tiles, and it knows where the primitives are stored, so this only adds the addition of setting a bit for each tile a primitive is found to be located within.

In step 916, the data characterisation unit 310 generates and stores primitive block characterisation data and per-tile primitive block usage data in the memory. In some examples, the data characterisation unit 310 also generates and stores in the memory render-wide redundancy data indicating one or more characteristics of the render useful in the redundancy detection described later. The data characterisation unit may cause this information to be stored in external memory block $304_1$. Alternatively (or additionally), some or all of this information may be stored locally to the graphics processor, for example in registers in the data characterisation unit or in a cache memory. This information will be used to compare the current render with a previous render to determine whether parts or all of the current render are redundant (as will be described in more detail below).

FIG. 8 shows an example data characterisation output block 810 generated by the data characterisation unit 310. The data characterisation output block 810 comprises a header 812, primitive block data 814 and per-tile primitive block lists 816. The header 812 comprises one or more valid flags generated by the data characterisation unit 310, which can be used to indicate whether the current render is suitable for testing for redundant rendering. This can save processing at the testing stage, as described below. In one example, a valid flag can be set to indicate that the whole current render is not suitable for testing for redundant rendering, and hence all the associated redundancy testing can be skipped. This valid flag can be set to a predetermined value by the data characterisation unit 310 based on the render-wide state data 804. For example, the valid flag may be set to a predetermined value if the render-wide state data 804 indicates that the render is part of a scene using multiple render targets (or other advanced rendering techniques) or that the render comprises more draw calls than a threshold number. These are indications that this is a complex render that is unlikely to benefit from redundant rendering testing. In some examples, if the data characterisation unit 310 determines that the valid flag should be set to indicate that the whole current render is not suitable for testing for redundant rendering, then the remainder of the data in the data characterisation output block 810 does not need to be generated and stored.

The header 812 may further comprise the number of primitive blocks generated by the primitive block generator 802. This data is useful for several reasons. It can be used as part of the testing process to eliminate renders that are too complex to benefit from redundancy testing (as outlined below in connection with FIGS. 10 and 11). It is also beneficial for interpreting the rest of data characterisation output block 810, as the number of primitive blocks generated will depend on the scene being rendered, and is not pre-known. Therefore, providing the number of primitive blocks in the header ensures that it can be determined how large the primitive block data 814 is, as well as the number of bits in each per-tile primitive block list 816. The header 812 may also comprise the clear colour for the render. As noted above, the clear colour is a render-wide property, and can be used in the redundancy detection described later.

The primitive block data 814 comprises data characterising the content of the one or more primitive blocks. For example, FIG. 8 illustrates this with data for primitive block PB0, followed by data for PB1, etc. The primitive block data 814 may, in one example, be a direct copy of the primitive blocks 806 generated by the primitive block generator 802. In another example, the primitive block data 814 may be a hash of the primitive blocks 806 generated by the primitive block generator 802, as described in more detail below.

The per-tile primitive block lists 816 are data indicating which of the one or more primitive blocks contain primitives located within that tile. This is based on the primitive block list 808 provided by the tiling unit 308. The per-tile primitive block lists 816 can comprise, for example, a bitmask for each tile indicating which of the one or more primitive blocks contain at least one primitive that is located within that tile, where the position of a bit within the bitmask indicates the identity of the primitive block, and the value of the bit (one or zero) indicates whether that primitive block contains primitives located within that tile. The per-tile primitive block lists 816 stored by the data characterisation unit 310 may be a direct copy of the primitive block list 808 from the tiling unit 308.

Note that the example arrangement of data shown in FIG. 8 is an illustrative example only, and the data can be structured in any suitable manner.

As noted above, the primitive block data 814 may be in the form of a hash of the original data. The benefit of using a hash is that it reduces the storage requirements, as the hash is smaller than the original data, and in some examples can be of a fixed size irrespective of the size of the original data. The data characterisation unit 310 may be configured to store the primitive block data 814 in the form of one or more hash representations. The data characterisation unit 310 may generate the hash values by implementing a hash function. Many well-known hash functions exist, such as XOR-based functions, cyclic redundancy check (CRC) based functions, as well as more complex schemes such as MD5, SHA-1, and SHA-2.

The primitive block data 814 may be hashed on a per-primitive block basis; i.e. each primitive block is hashed separately. Although storing the primitive block data 814 in the form of one or more hash values does reduce the storage requirements in the memory block $304_1$, it still requires that the data characterisation unit 310 perform a hash calculation for each primitive block, consuming processing resources of the graphics processing unit.

Figure 10:
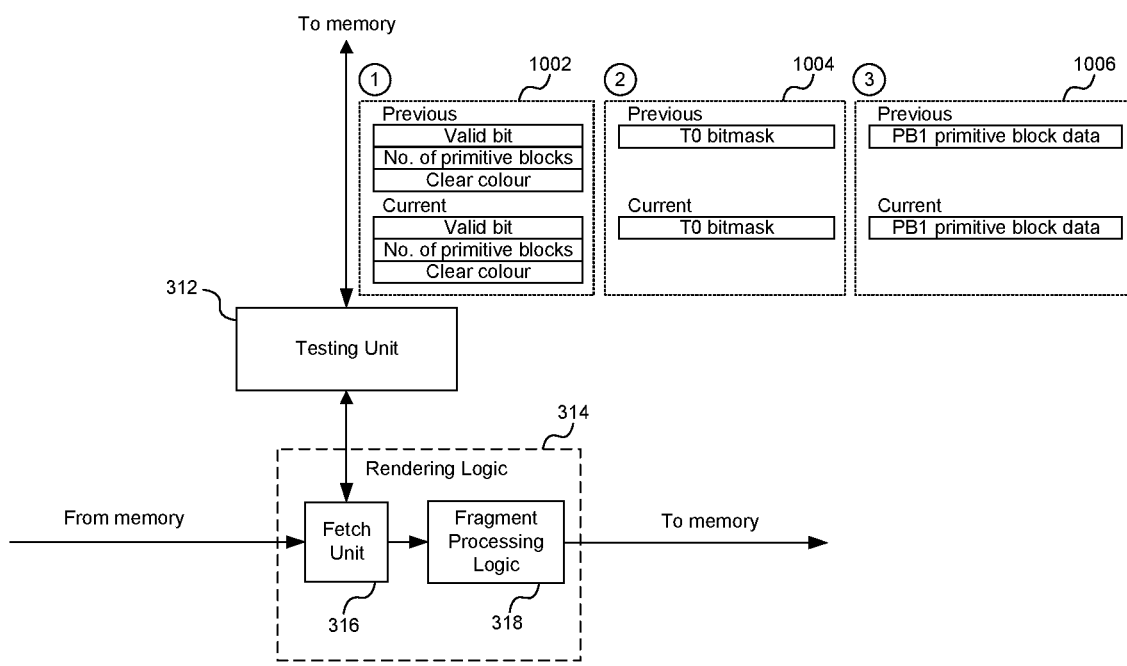
FIG. 10 shows the data provided to and analysed by a testing unit according to the second technique.
Figure 11:
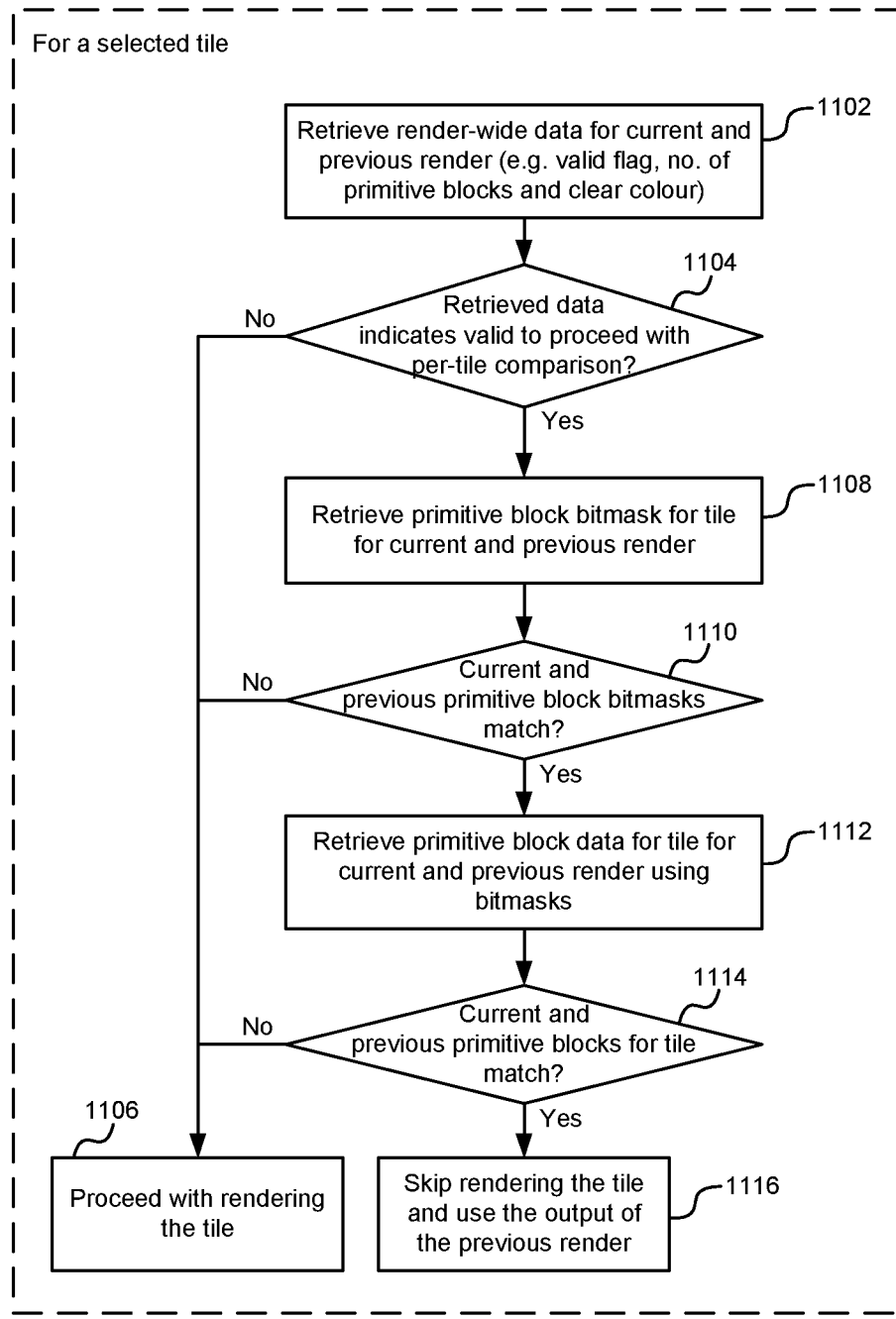
FIG. 11 shows a flowchart for the operation of the system of FIG. 10.

Reference is now made to FIG. 10 and FIG. 11, which show the data provided to and analysed by the testing unit 312 according to the "primitive block comparison" technique, and a flowchart illustrating how this operates.

FIG. 10 illustrates in more detail the rendering phase functionality including the testing unit 312, rendering logic 314, fetch unit 316 and fragment processing logic 318 of FIG. 3. In particular, FIG. 10 illustrates the data retrieved from memory and analysed by the testing unit 312 to determine whether the rendering of a particular tile is redundant. The testing unit 312 is configured to retrieve from memory and analyse various data items relating to the tile's current and previous render in a multi-stage process, and use this to determine whether the current render is redundant. In other words, the testing unit 312 determines whether the output of a previous render for that tile can be used as an output for the render.

In one example, the fetch unit 316 is configured to wait for the analysis to complete at the testing unit 312 before fetching the rendering data for the tile being rendered (i.e. the display list and associated primitive data). If the testing unit 312 determines that the render of the current tile is not redundant (i.e. needs to be rendered) then the testing unit 312 provides a signal to the fetch unit 316, which can initiate fetching the rendering data for the tile, and provide this to the fragment processing logic 318 which will perform the fragment shading, texturing etc. to render the tile and generate the output. Conversely, if the testing unit 312 determines that the render of the current tile is redundant (i.e. does not need to be rendered) then the testing unit 312 provides a signal to the fetch unit 316 indicating that the tile rendering data does not need to be fetched from memory. This information (which may be provided by the testing unit 312 or the fetch unit 316) is used by the rendering logic 314 and causes the rendering logic to retain in the memory the output of the previous render for the tile, and use this data as the output data for the current render for the tile.

In another example, to avoid the testing unit 312 stalling the graphics pipeline, the fetch unit 316 is configured to proceed with fetching the rendering data for the tile being rendered, without waiting for the testing unit 312 to complete the analysis. In this way, more memory bandwidth is potentially used, but the performance is improved. If the testing unit 312 determines that the render of the current tile is not redundant (i.e. needs to be rendered) then the fetch unit 316 continues fetching the rendering data for the tile, and provides this to the fragment processing logic 318 which will perform the fragment shading, texturing etc. to render the tile and generate the output. If the testing unit 312 determines that the render of the current tile is redundant (i.e. does not need to be rendered) then the testing unit 312 provides a signal to the fetch unit 316 indicating that the fetch of the tile rendering data should be ceased/interrupted, as the data is no longer needed. As above, this information (which may be provided by the testing unit 312 or the fetch unit 316) is used by the rendering logic 314 and causes the rendering logic to retain in the memory the output of the previous render for the tile, and use this data as the output data for the current render for the tile.

The operation of the testing unit 312 and the sequence of redundancy data used by the testing unit to efficiently determine whether a tile render is redundant is now described with reference to FIG. 10 in conjunction with FIG. 11.

For a selected tile that is being tested for redundancy prior to rendering, the testing unit 312 begins retrieving data from the data characterisation output block 810 that was stored in the memory by the data characterisation unit 310. However, because the data characterisation output block 810 is potentially a large block of data, the testing unit 312 may retrieve the data in a multi-stage process, in order to reduce the memory bandwidth and power consumption. In particular, this multi-stage process aims to quickly and efficiently eliminate many non-redundant tile renders without incurring significant memory bandwidth or computation costs.

In step 1102, in a first stage, the testing unit 312 retrieves data from the header 812 of the data characterisation output block 810, for both the current render and the previous render. The retrieved header data may be in the form of render-wide data. For example, as shown in FIG. 10, in this first stage, the testing unit 312 retrieves a first data block 1002 comprising one or more valid flags, the number of primitive blocks and the clear colour for the current and previous render. The valid flags may comprise a render-wide valid flag, as described above.

In step 1104, the testing unit 312 determines whether the data retrieved in the first data block 1002 indicates that it is valid to proceed with a per-tile comparison of more detailed render data. In the example of FIG. 10, the testing unit 312 determines this by checking whether the valid flag indicates that both the previous and current render data is suitable for redundancy testing. For example, the testing unit 312 can check that the render-wide valid flag is not set for both the current and previous render (e.g. indicating that neither render used complex rendering features or comprises too many draw calls).

The testing unit 312 may also use the value for the number of primitive blocks in the current and previous render to determine whether it is suitable to continue with redundancy testing for this tile. For example, the testing unit 312 can compare the number of primitive blocks in the current and previous render to a predefined limit. If the number of primitive blocks in either the current and previous render exceeds this limit, this may indicate that the render contains a lot of primitives, which is indicative of a complex scene that is less likely to be suitable for redundancy testing. In some examples, the predefined limit for the number of primitive blocks is between 64 and 128. Note that in alternative examples, the data characterisation unit 310 may compare the number of primitive blocks to the predefined limit and set the valid flag on the basis of this, rather than this being done by the testing unit 312. In the example of FIG. 10, the testing unit 312 further determines whether the clear colours for the current and previous renders match, by comparing the two values.

If any of the valid flags indicate the tile is not valid for redundancy testing, the number of primitive blocks exceeds the limit, or the clear colours do not match, then this indicates that no further comparisons should be made by the testing unit, as the tile is either not redundant or not suitable for redundancy testing. In this case, in step 1106, the tile is rendered as normal by the rendering phase of the GPU. Importantly, this decision can eliminate many non-suitable tiles from the redundancy testing process with only a very small amount of data being retrieved, and with very minor processing overhead. This therefore does not significantly degrade performance of the GPU.

If the validity data indicates that it is valid to proceed with a more detailed per-tile comparison to detect redundancy, then the process moves, in one example, to a second stage in step 1108 in which the testing unit retrieves the per-tile primitive block list 816 for tile being tested from the data characterisation output block 810. For example, in step 1108, the testing unit 312 retrieves the primitive block bitmask for the tile for the current and previous render. As illustrated in FIG. 10, if the tile being tested is T0, then a second data block 1004 is retrieved that includes the T0 primitive block bitmask for both the current and previous render. As described above, the per-tile primitive block bitmask includes information that identifies which primitive blocks contain primitives that are located in the tile being tested. As noted above, this is usually a small amount of data (especially for renders that have passed the first stage of not including too many primitive blocks).

In step 1110, the testing unit 312 compares the retrieved data to determine whether the per-tile primitive block list from the current and previous render matches. If the per-tile primitive block list from the current and previous render does not match, then this indicates that the primitives in the tile for the current and previous render are in different primitive blocks, and hence the tile is unlikely to be redundant. In this case, the process moves to step 1106 and the tile is rendered as normal in the rendering phase. Notably, this is a decision that can identify tiles that are likely to not be redundant using a small amount of data and a simple logical comparison, thereby without substantial bandwidth, power or processing overhead.

Note that the comparison of the bitmasks can, in some alterative examples, be omitted, and instead the comparison can move from the first stage to the third stage (outlined below). Whilst this does not save any memory bandwidth (as the bitmasks are used in the third stage) it may reduce the time to complete the analysis and removes any need for the current and previous render to have the same structure for the bitmasks to enable comparison (e.g. they can have different lengths). It may also avoid a situation where only a portion of the scene changes between renders, so that the primitive blocks are assembled differently, but some tiles may still be redundant.

If the per-tile primitive block list from the current and previous render does match, then the process moves to the third stage. The third stage is a comprehensive comparison to confirm whether the tile is redundant, using the primitive block data 814 from the data characterisation output block 810. In step 1112, the testing unit 312 uses the current and previous primitive block list for the tile to retrieve the indicated relevant primitive block data 814 for the tile for the current and previous render. For example, as shown in FIG. 10, if the tile being tested is T0 and both the current and previous primitive block list for T0 indicates that primitive block 1 contained primitives located in this tile, then a third data block 1006 is retrieved that includes the primitive block data for PB1 for both the current and previous render. As described above, the primitive block contains information on where the vertices of the primitives in that primitive block are located, and how they will be rendered in the rendering phase. This therefore enables an accurate comparison of whether the contents of the tile is indeed identical to that of the previous render.

In step 1114, the testing unit 312 compares the retrieved data to determine whether the indicated primitive block data for the tile from the current and previous render matches. If the indicated primitive block data for the tile does not match, then it cannot be guaranteed that the content of the tile in the current and previous render is identical, and therefore the tile is considered to be not redundant. In this case, in step 1106, the tile is rendered as normal in the rendering phase. If the indicated primitive block data for the tile does match, then, in step 1116, it is determined that the tile is redundant, and the rendering of the tile can be skipped (or at least a portion of the processing avoided) in the rendering phase. In this case, the output of the previous render can be used as the output of the current render, as described above.

As noted above, in some examples, the primitive block data 814 may be in the form of hashed data. The testing unit 312 may require that the one or more hash values for the primitive blocks relevant to the tile match exactly to determine that the tile of the current render is redundant. If the information characterising the relevant primitive blocks is in the form of multiple hash values (e.g. multiple primitive blocks), each of those hash values may have to separately match a corresponding hash value for the previous render in order for the testing unit 312 to determine that the primitive content matches.

The amount of data retrieved for comparing the primitive blocks relevant for the tile is larger than in the other stages of the redundancy testing. However, without comparing this data an accurate decision on redundancy cannot be made. The impact of this on the performance/power consumption of the GPU is mitigated through the multi-stage testing process described above. By ensuring that unsuitable or non-redundant tiles are eliminated from the testing process early and with small amounts of redundancy data and simple comparisons, the retrieval of larger amounts of data needed for an accurate comparison are minimised.

Compared to the "pre- then post-geometry phase data comparison" technique described above, the "primitive block comparison" technique does lose some granularity in detecting redundant tile renders. In particular, it may be the case that one primitive within a primitive block is changed between renders, which will then mean that all tiles that identify that primitive block will not be deemed to be redundant, even if the changed primitive was not actually present in all those tiles. However, the "primitive block comparison" technique has the advantage of being more efficient in terms of storage and computation. Firstly, primitive blocks are being created within the GPU anyway, for use with the tiling process, so this is leveraging a data structure that is already being created. Secondly, the use of primitive blocks gives more efficient data storage. This is because each primitive is only contained in a single primitive block, and hence only stored once, regardless of how many tiles the primitive is in. Conversely, with the "pre- then post-geometry phase data comparison" technique, primitive data is stored in association with a tile, hence will be stored multiple times when it is located in multiple tiles. Thirdly, the use of primitive blocks is much more computationally efficient when hashing is used. This is because only one hash is calculated per primitive block, and each primitive is only contained in a single primitive block. This means that a primitive is only hashed once. With the "pre- then post-geometry phase data comparison" technique by contrast, a primitive is hashed multiple times when it is located in multiple tiles.

In order to improve the granularity of detecting redundant tiles in the "primitive block comparison" technique, in some examples the primitive block generator 802 may split each primitive block formed for the current render into multiple portions. The primitive block generator 802 may for example split each primitive block into a fixed number of portions, or into portions of fixed size. Each primitive block portion may then contain a subset of the primitives within the primitive block. The tiling unit 308 may then generate, for each tile, 'n' bitmasks if each primitive block is split into 'n' portions, each bitmask associated with a portion and indicating which primitive blocks for that portion contain one or more primitives located within the tile. This is illustrated schematically in FIG. 12.

Figure 12:
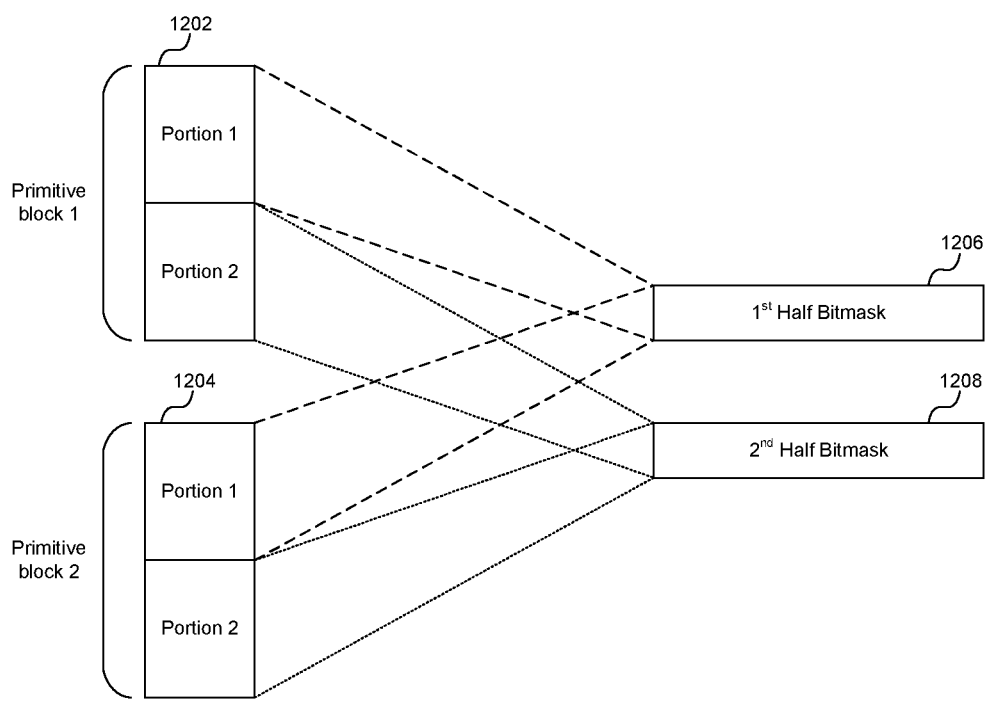
FIG. 12 shows multiple bit masks generated for each tile when primitive block data is split into multiple primitive block sections.

FIG. 12 shows an example in which two primitive blocks 1202 and 1204 are formed by the primitive block generator 802 for the current render. The primitive block generator 802 then splits each primitive block into multiple portions, in this example two sections. The primitive block portions for each primitive block are communicated from the primitive block generator 802 to the data characterisation unit 310.

The tiling unit 308 then generates a number of bit masks for each tile equal in number to the number of primitive block portions forming each primitive block. Thus, in this example, the tiling unit 308 generates two bitmasks per tile, shown in FIG. 12 at 1206 and 1208. Each bitmask corresponds to a respective primitive block portion number (illustrated by the dashed lines in FIG. 12). Thus, each bitmask for the tile indicates which primitive block portions of a given primitive block portion number contain primitives located within the tile. In the example shown in FIG. 12, bitmask 1206 indicates which primitive block portions of portion number 1 contain primitives located within the tile, and bitmask 1208 indicates which primitive block portions of portion number 2 contain primitives located within the tile. In other words, in the example of FIG. 12 where the primitive blocks are split in half, bitmask 1206 indicates when a primitive from the $1^{st}$ half of any primitive block is located within the tile, and bitmask 1208 indicates when a primitive from the $2^{nd}$ half of any primitive block is located within the tile.

The relationship between the bitmasks for the tile and the primitive block portions can be expressed mathematically by saying that each bitmask $b_i$, indicates which primitive block sections $pb_{ij}$ for j=1 . . . N contain a primitive located within the tile, where $pb_{ij}$ is the primitive block for section number i of primitive block j, and N is the number of primitive blocks formed for the render.

The data characterisation unit 310 then stores in the data characterisation output block 810 the primitive block data 814 as above, but the portions are stored separately (and optionally hashed separately). The data characterisation unit 310 also stores in the data characterisation output block 810 the multiple bitmasks per-tile, each relating to a different primitive block portion. Note that although the primitive block generator 802 is described as splitting the primitive blocks, in other examples this functionality can be performed by the data characterisation unit 310. Likewise, the tiling unit 308 is described above as generating the multiple bitmasks per-tile, but in other examples this can be derived by the data characterisation unit 310.

Compared to the example in which the primitive blocks are not split into sections, this approach has increased memory requirements for the memory block $304_1$. This is because the size of the primitive block section list is larger than the size of the primitive block list; and by splitting the primitive blocks into sections, multiple bitmasks need to be stored per tile, rather than a single bitmask per tile. However, this approach has the advantage of increased granularity. This is because under this approach, if the primitives within a tile are from a section of the primitive block that remains unchanged between renders, the tile will be identified as redundant even if a primitive from another section of the primitive block has changed.

Reference is now made to FIG. 13, which shows how information for current and previous renders may be stored in memory, for either the first or second technique described above. For example, it was described with reference to step 512 and 916 that the data characterisation unit causes the data characterisation output block 416/810 to be stored in memory block $304_1$. The memory block $304_1$ may also have stored therein the data characterisation output block for the previous render. To minimise storage requirements, the memory block $304_1$ may only store the data characterisation output block for two renders: the current render, and the previous render being compared to the current render.

Thus, when the data characterisation unit 310 writes the information to the memory block $304_1$ for the current render, it may be important that the data characterisation unit does not overwrite the information for the previous render being compared to the current render. Two approaches for avoiding this will now be described with reference to FIGS. 13A and 13B.

Figure 13A:
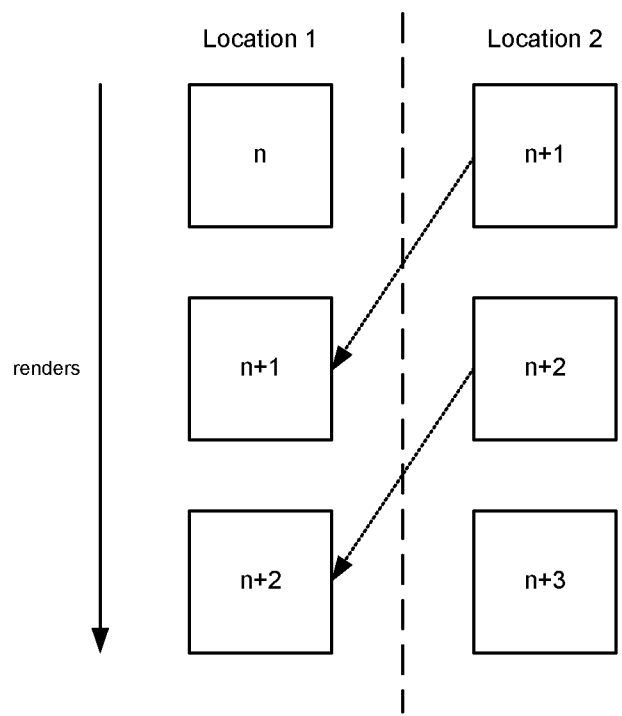
FIGS. 13A and 13B shows how information for current and previous renders may be stored in memory.

FIG. 13A schematically shows the storage location of information stored by the data characterisation unit within the memory block $304_1$ as multiple renders are performed. Each rectangular box indicates the data characterisation output block for a render. The value within each rectangular box indicates the render number. In this example, render n is performed first, followed by render n+1, n+2 etc. In this example, the data characterisation unit 310 stores the information for the current render in the same location in memory $304_1$ each time. That is, when render n+1 is being performed, information for render n+1 is stored in location 2; when render n+2 is being performed, information for render n+2 is also stored in location 2 etc. Thus, to avoid the information for the current render from overwriting that of the previous render (which would prevent the information from being able to be compared), the information stored in location 2 is copied across to location 1 at the conclusion of each render. For instance, following the conclusion of render n+1, information for that render is moved across to location 1. The information for the next current render (n+2) can then be written to the second location so that information for both renders n+1 and n+2 is stored in memory $304_1$, enabling that information to be compared.

Figure 13B:
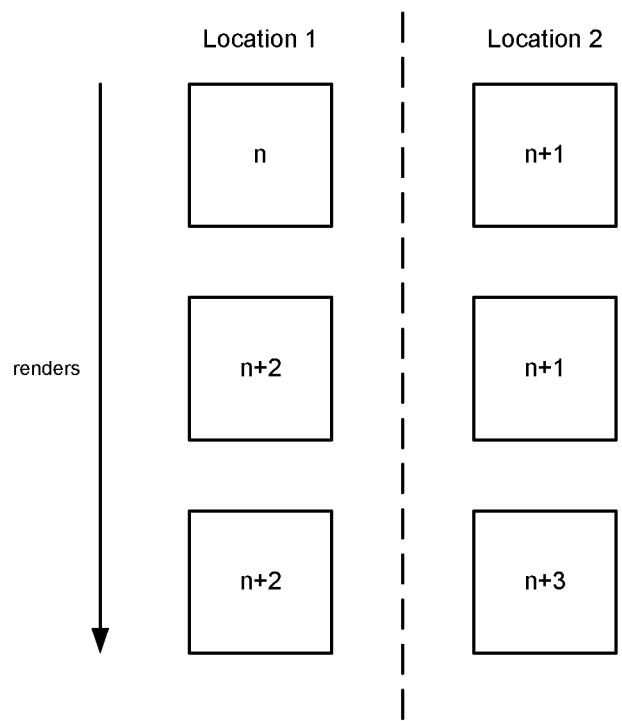

An alternative approach to storing the information is shown in FIG. 13B. In this approach, the data characterisation unit 310 is arranged to store the data characterisation output block for the current render in a location in memory $304_1$ that is dependent on the storage location of the data characterisation output block for the previous render. For example, when the current render is render n+1, the information for the previous render n is stored in location 1, and thus the data characterisation unit 310 causes the information to be stored in the other memory location, location 2. When the current render is render n+2, the information for the previous render is stored in location 2, and so the data characterisation unit causes the information to be stored in the other memory location (location 1).

In order for the data characterisation unit 310 to know in which location to write the information each render, the data characterisation unit may store an indication of the storage location for the current render relative to the storage location for the previous render. For example, when the current render is render n+1, the data characterisation unit stores an indication of the storage location of the information for render n+1 within the memory $304_1$ relative to the storage location of the information for the previous render n. When the current render is render n+2, the data characterisation unit uses the indication of the storage location of the information for the previous render (now render n+1) relative to the storage location of the information for the render prior to the previous render (now render n) to determine where to store the information for the current render n+2. This approach has the advantage of not having to transfer the storage information between memory locations at the conclusion of each render.

Figure 14:
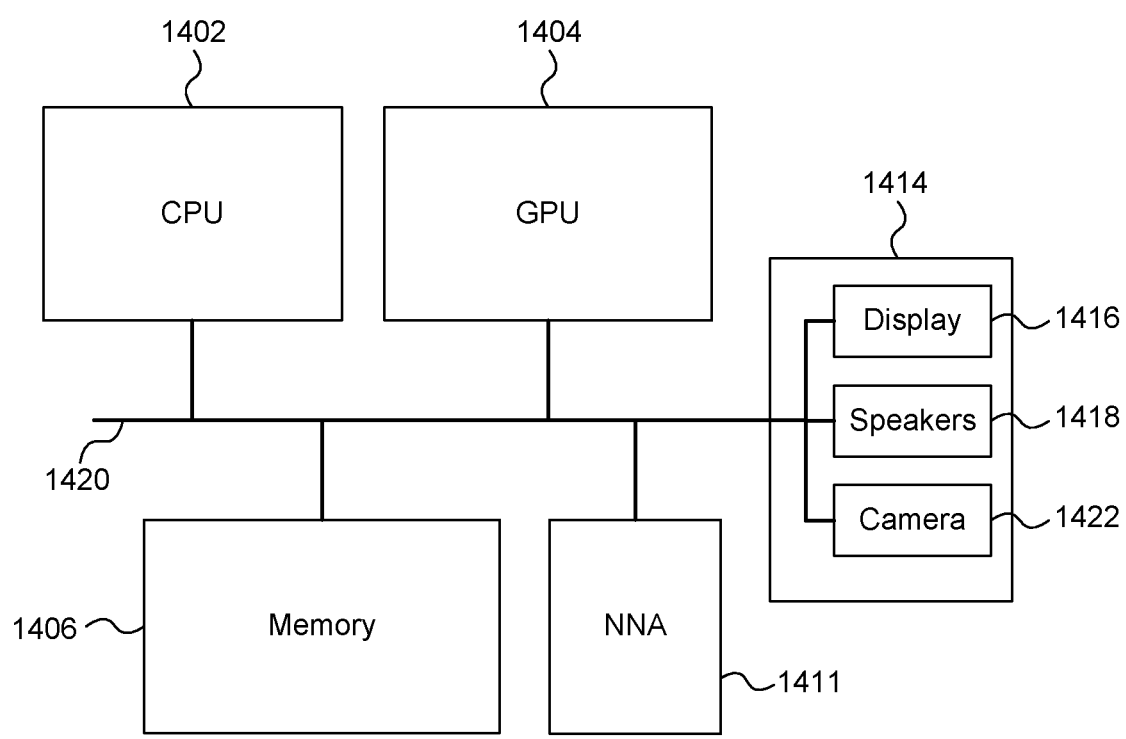
FIG. 14 shows a computer system in which the graphics processing systems described herein may be implemented.

FIG. 14 shows a computer system in which the graphics processing systems described herein may be implemented. The computer system comprises a CPU 1402, a GPU 1404, a memory 1406, a Neural Network Accelerator (NNA) 1411 and other devices 1414, such as a display 1416, speakers 1418 and a camera 1422. The components of the computer system can communicate with each other via a communications bus 1420.

The graphics processing system of FIGS. 1-14 are shown as comprising a number of functional blocks. This is schematic only and is not intended to define a strict division between different logic elements of such entities. Each functional block may be provided in any suitable manner. It is to be understood that intermediate values described herein as being formed by a graphics processing system need not be physically generated by the graphics processing system at any point and may merely represent logical values which conveniently describe the processing performed by the graphics processing system between its input and output.

The graphics processing system described herein may be embodied in hardware on an integrated circuit. The graphics processing system described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing system configured to perform any of the methods described herein, or to manufacture a graphics processing system comprising any apparatus described herein. An integrated circuit definition dataset may be, for example, an integrated circuit description.

Therefore, there may be provided a method of manufacturing, at an integrated circuit manufacturing system, a graphics processing system as described herein. Furthermore, there may be provided an integrated circuit definition dataset that, when processed in an integrated circuit manufacturing system, causes the method of manufacturing a graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing system will now be described with respect to FIG. 15.

Figure 15:
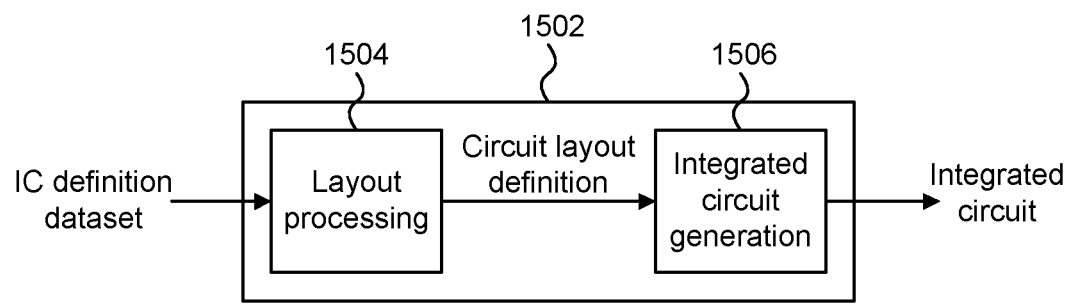
FIG. 15 shows an integrated circuit manufacturing system for generating an integrated circuit embodying a graphics processing system.

FIG. 15 shows an example of an integrated circuit (IC) manufacturing system 1502 which is configured to manufacture a graphics processing system as described in any of the examples herein. In particular, the IC manufacturing system 1502 comprises a layout processing system 1504 and an integrated circuit generation system 1506. The IC manufacturing system 1502 is configured to receive an IC definition dataset (e.g. defining a graphics processing system as described in any of the examples herein), process the IC definition dataset, and generate an IC according to the IC definition dataset (e.g. which embodies a graphics processing system as described in any of the examples herein). The processing of the IC definition dataset configures the IC manufacturing system 1502 to manufacture an integrated circuit embodying a graphics processing system as described in any of the examples herein.

The layout processing system 1504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1504 has determined the circuit layout it may output a circuit layout definition to the IC generation system 1506. A circuit layout definition may be, for example, a circuit layout description.

The IC generation system 1506 generates an IC according to the circuit layout definition, as is known in the art. For example, the IC generation system 1506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1506 may be in the form of computer-readable code which the IC generation system 1506 can use to form a suitable mask for use in generating an IC.

The different processes performed by the IC manufacturing system 1502 may be implemented all in one location, e.g. by one party. Alternatively, the IC manufacturing system 1502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to Figure by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 15, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of performing a render using a graphics processing unit configured to implement a tile-based graphics pipeline in which a rendering space is sub-divided into a plurality of tiles, the method comprising:
   receiving geometry data for the render, the geometry data comprising a plurality of primitives each associated with one or more vertex shader programs;
   processing the geometry data using the one or more vertex shader programs to generate one or more processed primitives;
   determining which of the processed primitives are located within each tile of the plurality of tiles;
   for at least one selected tile of the plurality of tiles, storing i) a representation of per-tile vertex shader data identifying the one or more vertex shader programs used to generate the processed primitives located within that tile, and ii) a representation of per-tile render data that can be used when rendering the processed primitives within that tile in subsequent stages of the graphics pipeline; and
   for the at least one selected tile, determining whether the output of a previous render for that tile can be used as an output for the render by comparing the per-tile vertex shader data of that tile with that of the previous render before comparing the per-tile render data of that tile with that of the previous render.

2. The method according to claim 1, wherein determining whether the output of the previous render for that tile can be used as the output for the render comprises:
   determining whether the per-tile vertex shader data matches corresponding per-tile vertex shader data for a previous render;
   in response to determining that the per-tile vertex shader data does match, determining whether the per-tile render data of that tile matches corresponding per-tile render data for the previous render; and
   in response to determining that the per-tile render data does match, using the output of the previous render for that tile as the output for the render.

3. The method according to claim 2, wherein determining whether the output of the previous render for that tile can be used as the output for the render further comprises: in response to determining that the per-tile vertex shader data does not match, causing the graphics pipeline to render that tile.

4. The method according to claim 2, wherein determining whether the output of the previous render for that tile can be used as the output for the render further comprises: in response to determining that the per-tile render data does not match, causing the graphics pipeline to render that tile.

5. The method according to claim 1, further comprising storing render-wide data indicating one or more characteristics of the render and, prior to determining whether the output of a previous render for that tile can be used as an output for the render, using the render-wide data to check whether to skip the per-tile vertex shader data and per-tile render data comparison and cause the graphics pipeline to render that tile.

6. The method according to claim 5, wherein the render-wide data comprises a clear colour, and using the render-wide data to check whether to skip the per-tile vertex shader data and per-tile render data comparison comprises determining whether the clear colour matches with that of the previous render.

7. The method according to claim 5, wherein the render-wide data comprises a valid flag, and using the render-wide data to check whether to skip the per-tile vertex shader data and per-tile render data comparison comprises determining whether the valid flag has a predetermined value.

8. The method according to claim 7, further comprising setting the valid flag to the predetermined value based on at least one of: data indicating that the render is part of a scene using multiple render targets; and the render comprises more draw calls than a threshold number.

9. The method according to claim 1, further comprising for the at least one selected tile of the plurality of tiles, storing iii) per-tile validity data indicating whether to skip the per-tile vertex shader data and per-tile render data comparison, wherein the per-tile validity data is set based on the number of processed primitives located within that tile.

10. The method according to claim 1, wherein the per-tile render data comprises vertex coordinate and vertex state data for each of the processed primitives located within that tile.

11. The method according to claim 10, wherein storing the representation of the per-tile render data comprises generating a hash of the vertex coordinate and vertex state data for each of the processed primitives located within that tile and storing the hash value.

12. The method according to claim 10, wherein the vertex state data comprises data associated with each vertex used to render the processed primitives in the tile, including one or more of: pixel shader identifiers; varyings; colour data; surface normal data; and texture data.

13. A graphics processing system configured to implement a tile-based graphics pipeline in which a rendering space is sub-divided into a plurality of tiles, comprising:
geometry processing logic configured to: receive geometry data for a render, the geometry data comprising a plurality of primitives each associated with one or more vertex shader programs; and process the geometry data using the one or more vertex shader programs to generate one or more processed primitives;
a tiling unit configured to determine which of the processed primitives are located within each tile;
a data characterisation unit configured to, for at least one selected tile of the plurality of tiles, store in a memory i) a representation of per-tile vertex shader data identifying the one or more vertex shader programs used to generate the processed primitives located within that tile, and ii) a representation of per-tile render data that can be used to render the processed primitives within that tile in subsequent stages of the graphics pipeline; and
a testing unit configured to determine, for the at least one selected tile, whether the output of a previous render for that tile can be used as an output for the render by comparing the per-tile vertex shader data of that tile with that of the previous render before comparing the per-tile render data of that tile with that of the previous render.

14. The graphics processing system according to claim 13, wherein, to determine whether the output of the previous render for that tile can be used as the output for the render, the testing unit is further configured to:
determine whether the per-tile vertex shader data matches corresponding per-tile vertex shader data for a previous render;
in response to a determination that the per-tile vertex shader data does match, determine whether the per-tile render data of that tile matches corresponding per-tile render data for the previous render; and
in response to a determination that the per-tile render data does match, use the output of the previous render for that tile as the output for the render.

15. The graphics processing system according to claim 14, wherein, to determine whether the output of the previous render for that tile can be used as the output for the render, the testing unit is further configured to: in response to a determination that the per-tile vertex shader data does not match, cause the graphics pipeline to render that tile.

16. The graphics processing system according to claim 14, wherein, to determine whether the output of the previous render for that tile can be used as the output for the render, the testing unit is further configured to: in response to a determination that the per-tile render data does not match, cause the graphics pipeline to render that tile.

17. The graphics processing system according to claim 13, wherein the data characterisation unit is further configured to store render-wide data indicating one or more characteristics of the render and, prior to determining whether the output of a previous render for that tile can be used as an output for the render, use the render-wide data to check whether to skip the per-tile vertex shader data and per-tile render data comparison and cause the graphics pipeline to render that tile.

18. The graphics processing system according to claim 13, wherein the data characterisation unit is further configured to, for the at least one selected tile of the plurality of tiles, store iii) per-tile validity data indicating whether to whether to skip the per-tile vertex shader data and per-tile render data comparison and render the primitives located within that tile to render the tile, wherein the per-tile validity data is set based on the number of processed primitives located within that tile.

19. The graphics processing system of claim 13, wherein the graphics processing system is embodied in hardware on an integrated circuit.

20. A non-transitory computer readable storage medium having stored thereon an integrated circuit definition dataset that, when processed in an integrated circuit manufacturing system, configures the integrated circuit manufacturing system to manufacture a graphics processing system configured to implement a tile-based graphics pipeline in which a rendering space is sub-divided into a plurality of tiles, the graphics processing system comprising:
geometry processing logic configured to: receive geometry data for a render, the geometry data comprising a plurality of primitives each associated with one or more vertex shader programs; and process the geometry data using the one or more vertex shader programs to generate one or more processed primitives;
a tiling unit configured to determine which of the processed primitives are located within each tile;
a data characterisation unit configured to, for at least one selected tile of the plurality of tiles, store in a memory i) a representation of per-tile vertex shader data identifying the one or more vertex shader programs used to generate the processed primitives located within that tile, and ii) a representation of per-tile render data that can be used to render the processed primitives within that tile in subsequent stages of the graphics pipeline; and
a testing unit configured to determine, for the at least one selected tile, whether the output of a previous render for that tile can be used as an output for the render by comparing the per-tile vertex shader data of that tile with that of the previous render before comparing the per-tile render data of that tile with that of the previous render.

\* \* \* \* \*